United States Patent
Turenne et al.

(10) Patent No.: US 8,580,218 B2
(45) Date of Patent: *Nov. 12, 2013

(54) METHOD OF PURIFYING SILICON UTILIZING CASCADING PROCESS

(75) Inventors: Alain Turenne, Kitchener (CA); Scott Nichol, Toronto (CA); Dan Smith, Brampton (CA)

(73) Assignee: Silicor Materials Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,710

(22) Filed: Jun. 12, 2012

(65) Prior Publication Data

US 2012/0260850 A1 Oct. 18, 2012

Related U.S. Application Data

(63) Continuation of application No. 12/729,561, filed on Mar. 23, 2010.

(60) Provisional application No. 61/235,861, filed on Aug. 21, 2009.

(51) Int. Cl.
*C01B 33/02* (2006.01)

(52) U.S. Cl.
USPC .......................................... 423/348; 423/350

(58) Field of Classification Search
USPC .................................. 423/348–350
See application file for complete search history.

(56) References Cited

U.S. PATENT DOCUMENTS

| | | | |
|---|---|---|---|
| 3,069,240 A * | 12/1962 | Armand | .................. 423/348 |
| 4,094,731 A | 6/1978 | Keyser et al. | |
| 4,124,410 A | 11/1978 | Kotval et al. | |
| 4,193,974 A * | 3/1980 | Kotval et al. | .................. 423/348 |
| 4,193,975 A | 3/1980 | Kotval et al. | |
| 4,195,067 A | 3/1980 | Kotval et al. | |
| 4,200,621 A | 4/1980 | Liaw et al. | |
| 4,246,249 A | 1/1981 | Dawless | |
| 4,256,717 A | 3/1981 | Dawless | |
| 4,312,846 A | 1/1982 | Dawless et al. | |
| 4,312,847 A | 1/1982 | Dawless | |
| 4,312,848 A | 1/1982 | Dawless | |
| 4,312,849 A | 1/1982 | Kramer | |

(Continued)

FOREIGN PATENT DOCUMENTS

| CN | 101460399 B | 3/2012 |
|---|---|---|
| EP | 0459421 A1 | 5/1991 |

(Continued)

OTHER PUBLICATIONS

"U.S. Appl. No. 12/244,839, Preliminary Amendment filed Mar. 22, 2010", 8 pgs.
"U.S. Appl. No. 12/288,357, Non-Final Office Action mailed Sep. 24, 2009", 9 pgs.
"U.S. Appl. No. 12/288,857, Notice of Allowance mailed Apr. 5, 2010", 7 pgs.

(Continued)

*Primary Examiner* — Anthony J Zimmer
(74) *Attorney, Agent, or Firm* — Schwegman Lundberg & Woessner P.A.

(57) ABSTRACT

The present invention relates to a method of purifying a material using a metallic solvent. The present invention includes a method of purifying silicon utilizing a cascade process. In a cascade process, as the silicon moves through the purification process, it contacts increasingly pure solvent metal that is moving through the process in an opposite direction.

24 Claims, 7 Drawing Sheets

(56) References Cited

U.S. PATENT DOCUMENTS

| | | | |
|---|---|---|---|
| 4,822,585 | A | 4/1989 | Dawless |
| 4,900,532 | A | 2/1990 | Kurz et al. |
| 5,678,807 | A | 10/1997 | Cooper |
| 6,585,797 | B2 | 7/2003 | Kinosz et al. |
| 6,632,413 | B2 | 10/2003 | Clark et al. |
| 7,727,503 | B2 | 6/2010 | Nichol |
| 7,883,680 | B2 | 2/2011 | Nichol |
| 7,959,730 | B2 | 6/2011 | Nichol |
| 2005/0139148 | A1 | 6/2005 | Fujiwara et al. |
| 2009/0092535 | A1* | 4/2009 | Nichol ............ 423/350 |
| 2009/0274607 | A1 | 11/2009 | Nichol |
| 2010/0233064 | A1 | 9/2010 | Nichol |
| 2010/0329959 | A1 | 12/2010 | Nichol et al. |
| 2011/0044877 | A1 | 2/2011 | Turenne et al. |
| 2011/0129405 | A1 | 6/2011 | Nichol |
| 2012/0255485 | A1 | 10/2012 | Nichol |

FOREIGN PATENT DOCUMENTS

| | | | |
|---|---|---|---|
| JP | 5319922 | A | 2/1978 |
| JP | 56022620 | A | 3/1981 |
| JP | 60103015 | A | 6/1985 |
| JP | 64069507 | A | 3/1989 |
| JP | 09055460 | A | 2/1997 |
| JP | 2003238139 | A | 8/2003 |
| JP | 2004535354 | A | 11/2004 |
| JP | 2004537491 | A | 12/2004 |
| JP | 2006027923 | A | 2/2006 |
| JP | 2007008789 | A | 1/2007 |
| WO | WO-9816466 | A1 | 4/1993 |
| WO | WO-0216265 | A1 | 2/2002 |
| WO | WO-03066523 | A1 | 8/2003 |
| WO | WO-2005063621 | A1 | 7/2005 |
| WO | WO 2007112592 | A1 * | 10/2007 |
| WO | WO-2009012583 | A1 | 1/2009 |
| WO | WO-2011020197 | A1 | 2/2011 |

OTHER PUBLICATIONS

"U.S. Appl. No. 12/288,857, Preliminary Amendment filed Jul. 7, 2009", 7 pgs.
"U.S. Appl. No. 12/288,857, Preliminary Amendment filed Oct. 23, 2008", 18 pgs.
"U.S. Appl. No. 12/288,857, Response filed Dec. 21, 2009 to Non Final Office Action mailed Sep. 24, 2009", 10 pgs.
"U.S. Appl. No. 12/670,263, Final Office Action mailed Mar. 23, 2012", 9 pgs.
"U.S. Appl. No. 12/670,263, Preliminary Amendment filed Jan. 22, 2010", 7 pgs.
"U.S. Appl. No. 12/729,561, Non Final Office Action mailed Feb. 1, 2013", 9 pgs.
"U.S. Appl. No. 12/729,561, Non Final Office Action mailed Sep. 29, 2011", 19 pgs.
"U.S. Appl. No. 12/729,561, Notice of Allowance mailed Mar. 9, 2012", 7 pgs.
"U.S. Appl. No. 12/729,561, Response filed Jan. 17, 2012 to Non Final Office Action mailed Sep. 29, 2011", 18 pgs.
"U.S. Appl. No. 12/729,561, Response filed Jul. 22, 2011 to Restriction Requirement mailed Jul. 6, 2011", 8 pgs.
"U.S. Appl. No. 12/729,561, Restriction Requirement mailed Jul. 6, 2011", 6 pgs.
"U.S. Appl. No. 12/784,576, 312 Amendment filed Dec. 21, 2010", 6 pgs.
"U.S. Appl. No. 12/784,576, Notice of Allowance mailed Sep. 24, 2010", 9 pgs.
"U.S. Appl. No. 12/784,576, PTO Response to 312 Amendment mailed Dec. 30, 2010", 2 pgs.
"U.S. Appl. No. 13/017,786, Non Final Office Action mailed Oct. 10, 2012", 6 pgs.
"U.S. Appl. No. 13/017,786, Non Final Office Action mailed Nov. 22, 2011", 16 pgs.
"U.S. Appl. No. 13/017,786, Notice of Allowance mailed Mar. 16, 2012", 8 pgs.
"U.S. Appl. No. 13/017,786, Preliminary Amendment filed Feb. 28, 2011", 4 pgs.
"U.S. Appl. No. 13/017,786, Response filed Jan. 27, 2012 to Non Final Office Action mailed Nov. 22, 2011", 7 pgs.
"U.S. Appl. No. 13/017,786, Supplemental Preliminary Amendment and Petition to Revive filed Feb. 5, 2013", 18 pgs.
"U.S. Appl. No. 13/158,626, Preliminary Amendment filed Jul. 12, 2011", 4 pgs.
"U.S. Appl. No. 13/158,626, Response filed Mar. 30, 2012 to Non Final Office Action mailed Jan. 3, 2012", 10 pgs.
"U.S. Appl. No. 13/532,083, Non Final Office Action mailed Jan. 24, 2013", 12 pgs.
"Australian Application No. 2007234343, Examiner Report mailed Mar. 1, 2011", 2 pgs.
"Australian Application No. 2007234343, Response Sep. 12, 2011 to Office Action mailed Aug. 16, 2011", 16 pgs.
"Australian Application No. 2007234343, Response filed Feb. 17, 2011 to Examiner's First Report mailed Feb. 17, 2010", 13 pgs.
"Australian Application No. 2007234343, Response filed Jul. 12, 2011 to Office Action mailed Mar. 1, 2011", 2 pgs.
"Australian Application Serial No. 2007234343. Office Action mailed Feb. 17, 2010", 2 pgs.
"Australian Application Serial No. 2007234343. Office Action mailed Aug. 9, 2011", 2 pgs.
"Canadian Application Serial No. 2,648,288, Notice of Allowance mailed Dec. 14, 2011", 1 pg.
"Canadian Application Serial No. 2,648,288, Office Action mailed Mar. 3, 2011", 4 Pgs.
"Canadian Application Serial No. 2,648,288, Office Action mailed May 25, 2010", 5 pgs.
"Canadian Application Serial No. 2,648,288, Response filed Sep. 1, 2011 to Office Action mailed Mar. 3, 2011", 19 pgs.
"Canadian Application Serial No. 2,648,288, Response filed Nov. 24, 2010 to Office Action mailed May 25, 2010", 8 pgs.
"Chinese Application Serial No. 200780019595.3, Office Action mailed Feb. 1, 2011", with English translation, 20 pgs.
"Chinese Application Serial No. 200780019595.3, Response filed Jun. 16, 2011 to Office Action mailed Feb. 1, 2011", with English translation, 20 pgs.
"European Application Serial No. 07719504.8, Amended Claims filed Dec. 17, 2008", 7 pgs.
"European Application Serial No. 07719504.8, Extended European Search Report mailed Feb. 27, 2012", 12 pgs.
"International Application Serial No. PCT/CA2007/000574, Preliminary Report on Patentability mailed Oct. 16, 2008", 9 pgs.
"International Application Serial No. PCT/CA2007/000574, Search Report and Written Opinion mailed Jul. 27, 2007", 13 pgs.
"International Application Serial No. PCT/CA2010/001288, International Preliminary Report on Patentability mailed Mar. 1, 2012", 7 pgs.
"International Application Serial No. PCT/US2010/001288, International Search Report mailed Nov. 22, 2010", 3 pgs.
"International Application Serial No. PCT/US2010/001288, Written Opinion mailed Nov. 22, 2010", 5 pgs.
"Japanese Application Serial No. 2009-503383, Notice of Grounds of Rejection mailed Dec. 27, 2011", with English translation, 9 pgs.
"Korean Application Serial No. 10-2008-7026844, Office Action mailed Dec. 17, 2010", English translation, 3 pgs.
"Malaysian Application Serial No. PI 20083943, Preliminary Examination mailed Nov. 13, 2008", 2 pgs.
"Malaysian Application Serial No. PI 20083943, Examiner's Search Report mailed Nov. 15, 2011", 7 pgs.
"Russian Application Serial No. 2008143439, Office Action mailed Mar. 21, 2011", with English translation, 6 pgs.
"U.S. Appl. No. 13/017,786 , Response filed Apr. 9, 2013 to Non Final Office Action mailed Oct. 10, 2012", 6 pgs.

* cited by examiner

US 8,580,218 B2

METHOD OF PURIFYING SILICON UTILIZING CASCADING PROCESS

CROSS REFERENCE TO RELATED APPLICATION(S)

This application is a continuation and claims the benefit of priority under 35 U.S.C. §120 to U.S. patent application Ser. No. 12/729,561, filed on Mar. 23, 2010, which claims the benefit of priority under 35 U.S.C. §119(e) to U.S. Provisional Application No. 61/235,861, filed Aug. 21, 2009, the benefit of priority of each of which is claimed hereby; and each of which are incorporated by reference herein in its entirety.

BACKGROUND

Solar cells are currently utilized as an energy source by using their ability to convert sunlight to electrical energy. Silicon is used almost exclusively as the semiconductor material in such photovoltaic cells. A significant limitation currently on the use of solar cells has to do with the cost of purifying silicon to solar grade (SG). In view of current energy demands and supply limitations, there is an enormous need for a more cost efficient way of purifying metallurgical grade (MG) silicon (or any other silicon having greater impurities than solar grade) to solar grade silicon.

In a process to purify a material using a metallic solvent, valuable material is left in the metallic solvent along with the impurities. For example, in silicon purifying processes using a solvent metal, valuable silicon is left in the by-products. Repeated attempts to fractionally crystallize the silicon result in a proportionally increasing loss of silicon in the by-products. Companies and research groups have been working on making upgraded metallurgical (UMG) silicon using metallurgical processes involving various hydrometallurgical and pyrometallurgical processes. Many of these processes are limited in that they have difficulty reducing the amount of phosphorous relative to that of boron. Ultimately, this results in a final material that has an excess of phosphorus. The amount of phosphorous is higher than the amount of boron in ppmw in the UMG silicon after purification and the amount of phosphorous is usually 2-3 times higher than the boron in ppmw.

Traditionally, the majority of solar cells are made using P-type semiconductors with higher boron levels than phosphorous levels. The UMG silicon is directionally solidified into boules or multicrystalline ingots. This directional solidification of UMG silicon increases the phosphorous level in the top of the ingot due to the difference of the segregation coefficients of boron and phosphorous. This concentration transition can cause a P/N transition to form between the areas of high phosphorus concentration and the areas of tower phosphorus concentration, reducing yield and also causing the resistivity to change with the height of the ingot. Most solar cells not made from UMG silicon are made by adding P-type boron-containing dopants to silicon purified by the Siemens process.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
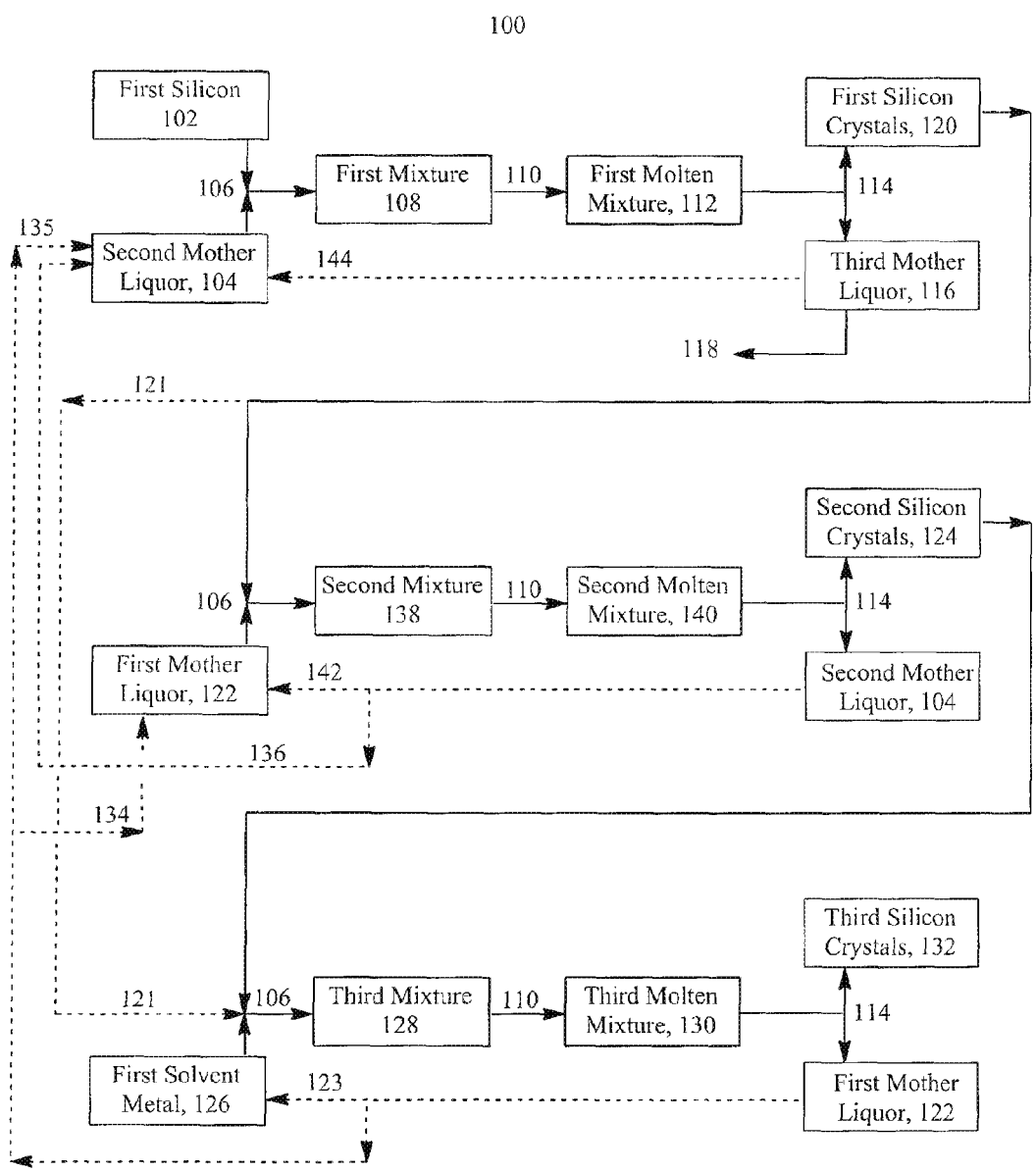
FIG. 1 illustrates a block flow diagram of a method of purifying silicon utilizing a triple pass cascade process, according to some embodiments.

The present invention provides a method of purifying materials with a metallic solvent. Embodiments of the present invention include benefits and advantages such as lower amounts of impurities and more consistent concentrations of impurities in purified materials. The method can provide a purified material of more consistent quality, such that more complete utilization of the purified material can occur. Another benefit can include the production of purified material that can be used to generate higher quality products. In embodiments that recycle mother liquor, the method can waste less of the material to be purified, and can make more efficient use of the metallic solvent.

The present invention also provides a method to purify silicon. The method includes contacting a first silicon with a second mother liquor. The contacting of the first silicon with a second mother liquor provides a first mixture. The method also includes melting the first mixture. Melting the first mixture is performed sufficiently to provide a first molten mixture of the first silicon and the second mother liquor. The method also includes cooling the first molten mixture. The cooling of the first molten mixture forms first silicon crystals and a third mother liquor. The method also includes separating the first silicon crystals and the third mother liquor. The method also includes contacting the first silicon crystals with a first mother liquor. The contacting of the first silicon with a first mother liquor provides a second mixture. The method also includes melting the second mixture. Melting the second mixture is performed sufficiently to provide a second molten mixture of the first silicon crystals and the first mother liquor. The method also includes cooling the second molten mixture. The cooling of the second molten mixture provides second silicon crystals and a second mother liquor. The method also includes separating the second silicon crystals and the second mother liquor. The method also includes contacting the second silicon crystals with a first solvent metal. The contacting of the second silicon crystals with the first solvent metal provides a third mixture. The method also includes melting the third mixture. Melting the third mixture is performed sufficiently to provide a third molten mixture of the second silicon crystals and the first solvent metal. The method also includes cooling the third molten mixture. Cooling the third molten mixture forms third silicon crystals and a first mother liquor.

The method also includes separating the third silicon crystals and the first mother liquor. The method also includes mother liquors and first solvent metals that include a solvent metal. In specific embodiments, the solvent metal can be aluminum. The method also optionally includes repeating any crystallization pass multiple times.

In specific embodiments, the method also provides that the above steps can be preceded by contacting a silicon A with a purifying material. The contacting is performed sufficiently to provide a mixture A. The method also provides melting the mixture A. The melting of the mixture A is performed sufficiently to provide a molten mixture A. The method also provides cooling the molten mixture A. The cooling is performed sufficiently to provide a first silicon and a fourth mother liquor. The method also provides separating the first silicon and the fourth mother liquor. When these optional steps are used prior to the above steps, a quadruple pass cascade is provided.

In specific embodiments, the step of contacting the first silicon crystals and a first mother liquor to the step of separating the second silicon crystals and the second mother liquor are independently optional. The method includes optionally contacting the first silicon crystals with a first mother liquor. The optional contacting of the first silicon with a first mother liquor provides a second mixture. The method also includes optionally melting the second mixture. Optionally melting the second mixture is performed sufficiently to provide a second molten mixture of the first silicon crystals and the first mother liquor. The method also includes optionally cooling the second molten mixture. The optional cooling of the second molten mixture provides second silicon crystals and a second mother liquor. The method also includes optionally separating the second silicon crystals and the second mother liquor. The optional steps from contacting the first silicon crystals and a first mother liquor to the step of separating the second silicon crystals and the second mother liquor can be skipped. If none of the optional steps are performed, then after the step of separating the first silicon crystals and the third mother liquor, the first silicon crystals are contacted with a first solvent metal.

In specific embodiments, the method of the present invention further includes melting the third silicon crystals. Melting the third silicon crystals is performed sufficiently to provide melted third crystals. The method also provides directionally solidifying the melted third crystals. The directional solidification is performed sufficiently to provide a solidified silicon. The method also provides removing at least a portion of the solidified silicon. The method also optionally provides that the directional solidification can be repeated multiple times.

The invention also includes a purified silicon that includes silicon, phosphorus and boron. The amount of phosphorus can be less than the amount of boron as measured in ppmw. The amount of boron can be less than 0.7 ppmw. Additionally, the amount of other metallic impurities can be each less than 1 ppmw.

The method includes contacting a first material with a purifying material. The contacting is sufficient to provide a first mixture. The method also includes melting the first mixture. The melting of the mixture of the first material and the purifying material forms a first molten mixture. The method also includes cooling the first molten mixture. The cooling is sufficient to form first crystals of the first material and a third mother liquor. The method also includes the use of purifying materials that include a second material. The method also includes the use of first materials that have a higher melting point than the second material. The method also includes the use of second materials that are metallic. The method can optionally include the use of purifying materials that have less impurities than the third mother liquor.

DETAILED DESCRIPTION

Reference will now be made in detail to certain claims of the disclosed subject matter, examples of which are illustrated in the accompanying drawings. While the disclosed subject matter will be described in conjunction with the enumerated claims, it will be understood that they are not intended to limit the disclosed subject matter to those claims. On the contrary, the disclosed subject matter is intended to cover all alternatives, modifications, and equivalents, which may be included within the scope of the presently disclosed subject matter as defined by the claims.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The invention provides a method of purifying silicon using cascading or a cascade process. Cascading refers to a counter-current flow of material. Cascading counter-current flows insert silicon feed stock in one end of the process (i.e., the beginning) and purified silicon is removed at the other end of the process (i.e., the end). A solvent metal, such as aluminum, moves through the process in the opposite direction to which the metal feed stock moves, by going into the end of the process and being reused in the direction towards the start of the process, exiting the process at the beginning, and containing more impurities when it exits than when it entered the process. The silicon then contacts increasingly pure solvent metal as it goes through the process, and its impurity levels are reduced. Any suitable number of cascading steps are envisioned to be included within embodiments of the methods described herein. Mother liquors can be reused in the same step or in other steps, and can also be supplemented with solvent metal.

Embodiments of the present invention can have benefits and advantages over other methods. For example, advantages of the present invention can include the achievement of lower and more consistent levels of impurities in a final purified silicon. The method can generate a puffed silicon product which is of a higher and more consistent quality, and that has a higher percentage of useful material, than that generated by some other purification methods. Thus, in using the purified silicon produced by the method, less material can be discarded, and a more efficient product made from the purified silicon can be possible. In embodiments that recycle mother liquor, the silicon that is still present in the mother liquor is conserved and wasted less than if the mother liquor is simply discarded. Lower boron and phosphorus levels in the purified silicon made by the method can make it possible to create wafers and cells from the purified silicon that can produce higher average cell efficiency than those produced by other solvent metal processes, thus the purified silicon can be more valuable than material produced via other methods. The lower phosphorus relative to boron levels allow for advantageous qualities in some embodiments in a resultant multicrystalline ingot or bottle, such as formation of a P/N junction, if any, closer to the surface. The absence of a P/N junction or the existence of such a junction closer to the surface of the silicon can result in less material being removed from the purified silicon prior to its use, thus less material needs to be discarded or recycled, silicon with less phosphorous compensation can result in a higher quality product derived from the purified silicon, e.g., higher efficiency solar cells. Other advantages of certain embodiments can include the lessening or elimination of: compensation of the resulting purified silicon to improve its efficiency, blending of the purified silicon with other materials, and the addition of other dopants to the purified silicon. The invention provides a method that can utilize the solvent used for crystallization of the silicon in a more efficient manner than other methods of silicon purification using crystallization. The invention provides a method that can be faster, of lower cost, more efficient, and/or less wasteful than other methods of silicon purification.

DEFINITIONS

As used herein, "mixture" refers to a combination of two or more substances in physical contact with one another. For example, components of a mixture can be physically combined as opposed to chemically reacting.

As used herein, "melting" refers to a substance changing from a solid to a liquid when exposed to sufficient heat.

As used herein, "purifying" refers to the physical or chemical separation of a chemical substance of interest from foreign or contaminating substances.

As used herein, "contacting" refers to the act of touching, making contact, or of bringing substances into immediate proximity.

As used herein, "crystallizing" includes the process of forming crystals (crystalline material) of a substance, from solution. The process separates a product from a liquid feed stream, often in extremely pure form, by cooling the feed stream or adding precipitants that lower the solubility of the desired product so that it forms crystals. The pure solid crystals are then separated from the remaining liquor by decantation, filtration, centrifugation or other means.

As used herein, "crystalline" includes the regular, geometric arrangement of atoms in a solid.

As used herein, "separating" refers to the process of removing a substance from another (e.g., removing a solid or a liquid from a mixture). The process can employ any suitable technique known to those of skill in the art, e.g., decanting the mixture, skimming one or more liquids from the mixture, centrifuging the mixture, filtering the solids from the mixture, or a combination thereof.

As used herein, "mother liquor" or "mother liquid" refers to the solid or liquid obtained after solids (e.g., crystals) are removed from a mixture of a solution of solids in a liquid. Depending on the thoroughness of the removal, the mother liquor can include an unappreciable amount of these solids.

As used herein, "silicon" refers to the chemical element that has the symbol Si and atomic number 14. As used herein, "metallurgical grade silicon" or "MG silicon" or "MG Si" refers to relatively pure (e.g., at least about 96.0 wt. %) silicon.

As used herein, "molten" refers to a substance that is melted, wherein melting is the process of heating a solid substance to a point (called the melting point) where it turns into a liquid.

As used herein, "solvent metal" refers to one or more metals, or an alloy thereof, which upon heating, can effectively dissolve silicon, resulting in a molten liquid. Suitable exemplary solvent metals include, e.g., copper, tin, zinc, antimony, silver, bismuth, aluminum, cadmium, gallium, indium, magnesium, lead, an alloy thereof, and combinations thereof.

As used herein, an "alloy" refers to a homogeneous mixture of two or more elements, at least one of which is a metal, and where the resulting material has metallic properties. The resulting metallic substance usually has different properties (sometimes significantly different) from those of its components.

As used herein, "liquidus" refers to a line on a phase diagram above which a given substance is stable in the liquid phase. Most commonly, this line represents a transition temperature. The liquidus can be a straight line, or it can be curved, depending upon the substance. The liquidus is most often applied to binary systems such as solid solutions, including metal alloys. The liquidus can be contrasted to the solidus. The liquidus and solidus do not necessarily align or overlap; if a gap exists between the liquidus and solidus, then within that gap, the substance is not stable as either a liquid or a solid.

As used herein, "solidus" refers to a line on a phase diagram below which a given substance is stable in the solid phase. Most commonly, this line represents a transition temperature. The solidus can be a straight line, or it can be curved, depending upon the substance. The solidus is most often applied to binary systems such as solid solutions, including metal alloys. The solidus can be contrasted to the liquidus. The solidus and liquidus do not necessarily align or overlap. If a gap exists between the solidus and liquidus, then within that gap, the substance is not stable as singly either a solid or a liquid; such is the case, for example, with the olivine (fosterite-fayalite) system.

As used herein, "dross" refers to a mass of solid impurities floating on a molten metal bath. It appears usually on the melting of low melting point metals or alloys such as tin, lead, zinc or aluminum, or by oxidation of the metal(s). It can be removed, e.g., by skimming it off the surface. With tin and lead, the dross can also be removed by adding sodium hydroxide pellets, which dissolve the oxides and form a slag. With other metals, salt fluxes can be added to separate the dross. Dross is distinguished from slag, which is a (viscous) liquid floating on the alloy, by being solid.

As used herein, "slag" refers to by-product of smelting ore to purify metals. They can be considered to be a mixture of metal oxides; however, they can contain metal sulfides and metal atoms in the elemental form. Slags are generally used as a waste removal mechanism in metal smelting. In nature, the ores of metals such as iron, copper, lead, aluminum, and other metals are found in impure states, often oxidized and mixed in with silicates of other metals. During smelting, when the ore is exposed to high temperatures, these impurities are separated from the molten metal and can be removed. The collection of compounds that is removed is the slag. A slag can also be a blend of various oxides and other materials created by design, such as to enhance the purification of the metal As used herein, "inert gas" refers to any gas, or combination of gases, that is not reactive under normal circumstances. Inert gases are not necessarily elemental and are often molecular gases. Like the noble gases, the tendency for non-reactivity is due to the valence, the outermost electron shell, being complete in all the inert gases. Inert gases can be, but are not necessarily, noble gases. Exemplary inert gases include, e.g., helium (He), Neon (Ne), Argon (Ar) and nitrogen ($N_2$).

As used herein, "directionally solidifying" refers to the solidification of molten metal so that feed metal is continually available for the portion undergoing solidification.

As used herein, "polycrystalline silicon" or "poly-Si" or "multicrystalline silicon" refers to a material consisting of multiple silicon crystals.

As used herein, "monocrystalline silicon" refers to silicon that has a single and continuous crystal lattice structure with almost no defects or impurities.

As used herein, "ingot" refers to a mass of material cast into a shape that is relatively easy to handle and transport. For example, metal heated past its melting point and molded into a bar or block is referred to as an ingot.

As used herein, "boule" refers to a single-crystal ingot synthetically produced. For example, in the Czochraiski or "CZ" process, a seed crystal is used to create a larger crystal, or ingot. This seed crystal is dipped into the pure molten silicon and slowly extracted. The molten silicon grows on the seed crystal in a crystalline fashion. As the seed is extracted the silicon sets and eventually a large, circular bottle is produced.

As used herein, "optional" refers to something that either is, or is not. For example, an optional step is a step that either is performed, or is not performed.

It is to be understood that embodiments of the present invention that purify silicon using aluminum as the crystallizing solvent are specific embodiments of a broader process that encompasses the purification of materials using a metallic solvent, in which the material to be purified has a higher melting point than the metallic solvent. One skilled in the art will realize that all references to the specific embodiment of purification of silicon using aluminum as solvent have broad applicability to a wide variety of materials and solvents.

Purification of Silicon

Figure 5:
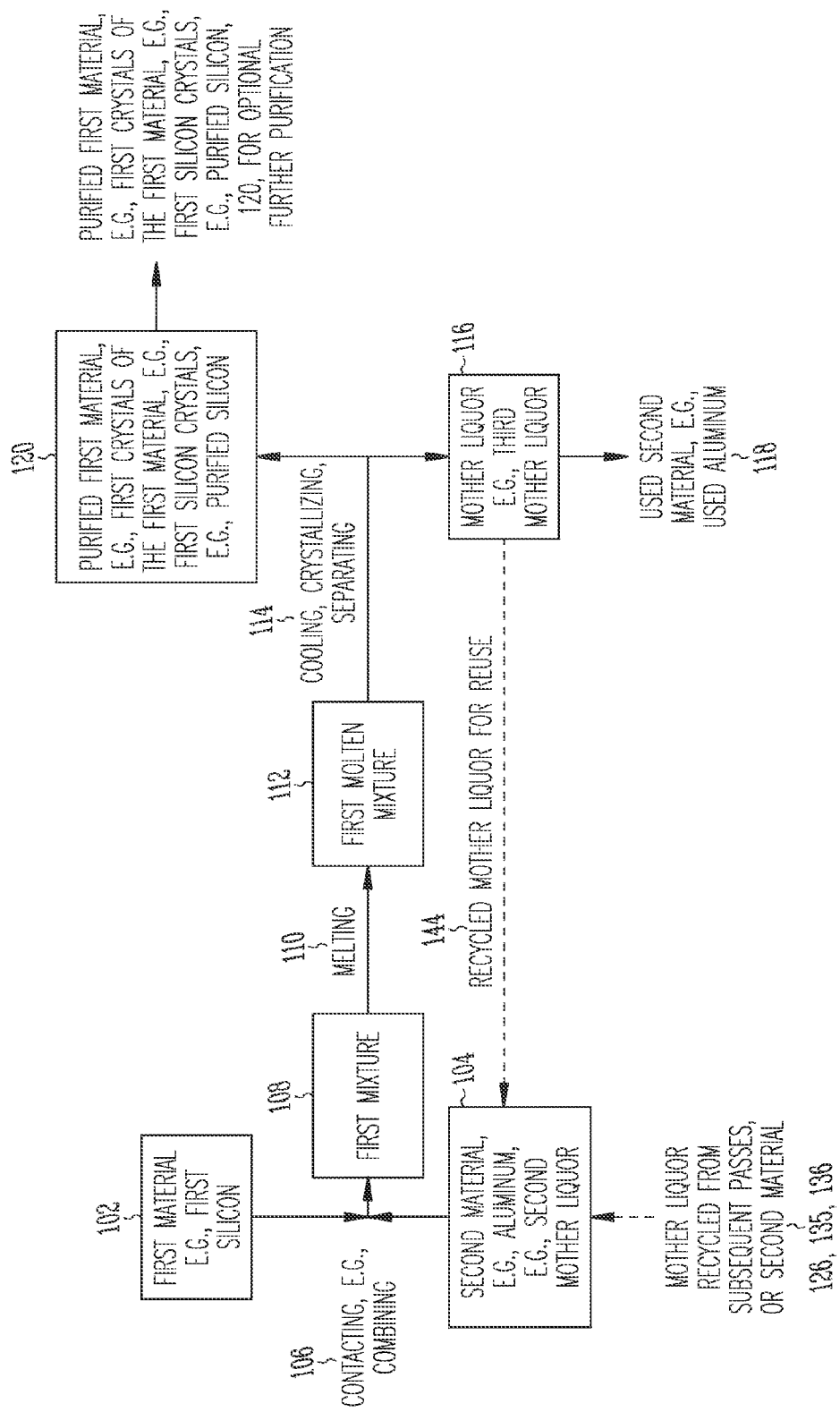
FIG. 5 illustrates a first pass detail of a cascade process for silicon purification, according to some embodiments.
Figure 6:
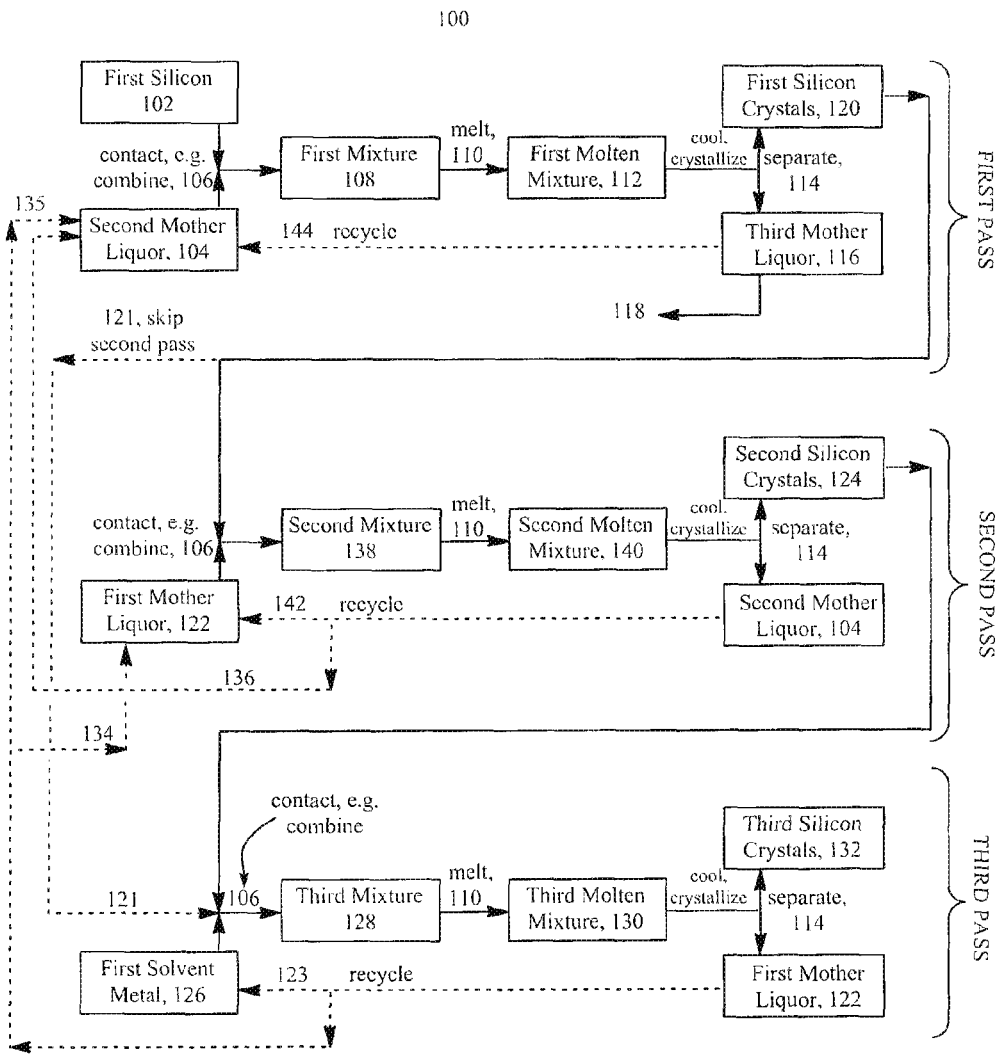
FIG. 6 illustrates a block flow diagram of a method of purifying silicon utilizing a triple pass cascade process, according to some embodiments.

Referring to FIGS. 1, 5, and 6, a block flow diagram 100 of a method of purifying silicon utilizing a cascade process is shown, according to some embodiments. A first silicon 102 can contact 106 a second mother liquor 104 to form a first mixture 108. The first mixture 108 can be melted 110 to form a first molten mixture 112. The first molten mixture 112 can then be cooled and separated 114 into first silicon crystals 120 and a third mother liquor 116. The third mother liquor 116 can then be removed from the process and sold 118 for use in other industries or all or a portion of it can be recycled 144 back with second mother liquor 104. One example of an industry for which the third mother liquor 116 would be of value would be the aluminum foundry industry for use in aluminum silicon alloys for castings.

The contacting of silicon or silicon crystals to a mother liquor or a solvent metal can occur in any suitable manner known to those of skill in the art. The manner of contacting can include adding the silicon or silicon crystals to a mother liquor, and can also include adding the mother liquor to the silicon or silicon crystals. Methods of addition that avoid splashing or that avoid loss of material are encompassed by the envisioned manners of contacting. The contacting can be performed with or without stirring or agitation. The contacting can generate agitation. The contacting can be designed to generate agitation. The contacting can occur with or without heating. The contacting can generate heat, can be endothermic, or can generate no heat or loss of heat.

Optional stirring or agitation can be performed in any suitable manner known to those of skill in the art. Stirring can include mechanical stirring with paddles or other stirring devices. Agitation can include agitating by the injecting and bubbling of gases, and can also include the physical agitation of a container, including swirling or shaking. The addition of one material to another can cause agitation, and the manner of addition can be designed such as to produce agitation. The injection of a liquid into another liquid can also produce agitation.

The melting of a mixture of silicon or silicon crystals in a mother liquor or a solvent metal can occur in any suitable manner known to those of skill in the art. The manner of melting can include adding heat to the mixture by any suitable method to cause the desired melting of the silicon or silicon crystals. The heating can continue after a molten mixture has been achieved. The manner of melting can be conducted with or without agitation. The manner of melting can also include the silicon or silicon crystals melting as a result of being exposed to a mother liquor or solvent metal that is at a high enough temperature, e.g., at a temperature at or above the melting point of the silicon or silicon crystals; thus, the contacting of silicon or silicon crystals with a mother liquor or a solvent metal to produce a mixture can be combined with the step of melting the mixture of silicon or silicon crystals to provide a molten mixture. The melting temperature of a mixture can be inconsistent or variable, changing as the composition of the molten material changes.

Methods of adding heat to a mixture include any suitable method known by those of skill in the art. These methods include, for example, heating with a furnace or heating by injecting hot gases into a mixture, or heating with a flame generated from burning gases. Inductive heating can be used. The method of heating can be radiant heat. The method of heating can be by the conduction of electricity through the material to be heated. Also included are the use of plasma to heat, the use of an exothermic chemical reaction to heat, or the use of geothermal energy to heat. The mixing of the silicon or silicon crystals with the mother liquor or solvent metal can, depending of the impurities of the silicon and the content of the mother liquor, produce heat or absorb heat, which can in some embodiments result in the corresponding adjustment of the source of heating being beneficial.

Optionally, gas can be injected into the molten mixture before cooling, including chlorine gas, other halogen gas or halide-containing gas, or any suitable gas. The cooling of the molten mixture can be conducted in any suitable manner known to those of skill in the art. Included are cooling by removal from a source of heat, which includes cooling by exposure to room temperature or to temperatures below the temperature of the molten mixture. Included are cooling by pouring into anon-furnace container and being allowed to cool at below-furnace temperatures. In some embodiments, the cooling can be rapid; however, in other embodiments, the cooling can be gradual, therefore it can be advantageous to expose the cooling molten mixture to a source of cooling that is only incrementally lower than the current temperature of the molten mixture. The source of cooling can be gradually lowered in temperature as the molten mixture is cooled, and in some cases this could be achieved via sensitive or general monitoring of the temperature of the molten mixture as it is cooled. The purity of the resulting crystallized silicon can improve by cooling the mixture as slowly as possible, therefore all suitable manners of gradual cooling are envisioned to be encompassed by the present invention. Also included are more rapid methods of cooling, including refrigeration mechanisms. Exposure of the container holding the molten material to cooler materials, such as a liquid cooler than the molten mixture, such as water, or such as another molten metal, or such as a gas, including ambient or refrigerated air, are included. The addition of cooler materials to the molten mixture are included, such as the addition of another cooler mother liquor, or the addition of a cooler solvent metal, or the addition of another cooler material that can be removed from the mixture later, or that alternatively can be left in the mixture.

The mother liquor resulting from the cooling of a molten mixture and subsequent separation of silicon crystals and the mother liquor is envisioned to be optionally recycled to any prior step in the process. Once crystallization of silicon has occurred from a mother liquor, generally at least some amount of silicon will remain dissolved in the mother liquor, along with the impurities which are desired to stay dissolved in the mother liquor. To cool the molten mixture to a point where all or most of the silicon is crystalline can be in some cases not possible, or can negatively impact the purity of the resulting silicon crystals, or can be inefficient. In some embodiments, the purity of the crystals produced by only allowing less than all, or less than a majority, of the silicon to crystallize out of a molten mixture, can be significantly or at least partially improved. The energy required to heat and melt solvent metal can be economically inefficient, compared to combining hot mother liquors with mother liquors in prior steps, or compared to reusing hot mother liquors. The energy required to cool a molten mixture to a certain temperature in order to attain a certain yield of silicon crystals can be inefficient compared to not cooling the mother liquor to such a low temperature and accepting a tower yield of silicon crystals but then recycling the mother liquor.

The advantageous leaving of desired and undesired materials in the mother liquors is envisioned to be encompassed by some embodiments of the present invention; thus, in some embodiments the recycling of mother liquor to be used again in the same crystallization step or in earlier crystallization steps is a sometimes useful aspect. By recycling mother liquors, the silicon that is still present in the mixture of the mother liquor is conserved and wasted less than if the mother liquor is simply discarded or sold as by-product. In some embodiments the same or nearly the same degree of purity of silicon crystals can be achieved using a recycled mother liquor, or by using a mother liquor that has some recycled mother liquor in it, than if the mother liquor had no recycled mother liquor, or even than if the solvent from which crystallizing was occurring was pure solvent metal. Therefore, all degrees and variations of the recycling of mother liquors are encompassed within the scope of the present invention.

The separation of the mother liquor from the silicon solids can take place by any suitable method known to those of skill in the art. Any variation of draining or siphoning the liquid solvent away from the desired solids are encompassed within embodiments of the methods described herein. These methods include decantation, or the pouring of the mother liquor away from the desired solids. For a decantation, the desired solids can be held in place by gravity, by adhesion to themselves or to the sides of the container, by the use of a grate or mesh-like divider that selectively holds back solids, or by applying physical pressure to the solids to hold them in place. Methods of separation include centrifugal separation. Also included are filtration, using any filter medium, and with or without the use of a vacuum, and with or without the use of pressure. Also included are chemical means, such as dissolution or chemical transformation of the solvent, including using acid or base.

Referring to FIGS. 1 and 6, the first silicon crystals 120 can then be optionally contacted 106 with a first mother liquor 122 to form a second mixture 138. The second mixture 138 can be optionally melted to form a second molten mixture 140. The second molten mixture can be optionally cooled and separated 114 into second silicon crystals 124 and the second mother liquor 104. The second mother liquor 104 can then be directed back 136 in the process to contact a first silicon 102 or all or a portion of the second mother liquor 104 can be recycled 142 back to the first mother liquor 122. The steps from contacting the first silicon crystals to obtaining second silicon crystals are optional, in that they can be either skipped or these steps can be performed a number of times (e.g. 1, 2, 3, 4, etc.). If these steps are not performed 121, first silicon crystals 120 are then subsequently contacted with first solvent metal 126.

In another embodiment, the steps from contacting the first silicon crystals to obtaining second silicon crystals are performed. In these embodiments, step 121 is not performed. Thus, after the first molten mixture 112 is cooled and separated 114 into first silicon crystals 120 and a third mother liquor 116, the first silicon crystals 120 can then be contacted 106 with a first mother liquor 122 to form a second mixture 138. The second mixture 138 can be melted to form a second molten mixture 140. The second molten mixture can be cooled and separated 114 into second silicon crystals 124 and the second mother liquor 104. The second mother liquor 104 can then be directed back 136 in the process to contact a first silicon 102 or all or a portion of the second mother liquor 104 can be recycled 142 back to the first mother liquor 122.

In another embodiment, the steps from contacting the first silicon crystals to obtaining second silicon crystals are independently either performed or not performed. Thus, after the first molten mixture 112 is cooled and separated 114 into first silicon crystals 120 and a third mother liquor 116, the first silicon crystals 120 can then be optionally contacted 106 with a first mother liquor 122 to form a second mixture 138, or alternatively, the first silicon crystals 120 can then be contacted 106 with a first mother liquor 122 to form a second mixture 138. The second mixture 138 can be optionally melted to form a second molten mixture 140, or alternatively, the second mixture 138 can be melted to form a second molten mixture 140. The second molten mixture can be optionally cooled and separated 114 into second silicon crystals 124 and the second mother liquor 104, or alternatively, the second molten mixture can be cooled and separated 114 into second silicon crystals 124 and the second mother liquor 104. The second mother liquor 104 can then be directed back 136 in the process to contact a first silicon 102 or all or a portion of the second mother liquor 104 can be recycled 142 back to the first mother liquor 122.

The second silicon crystals 124 can be contacted 106 with a first solvent metal 126 to form a third mixture 128. The third mixture 128 can be melted 110 to form a third molten mixture 130. The third molten mixture 130 can then be cooled and separated 114 into third silicon crystals 132 and the first mother liquor 122. All or a portion of the first mother liquor 122 can then be directed back 134 in the process to contact the first silicon crystals 120. All or a portion of the first mother liquor 122 can be recycled 123 back to the first solvent metal 126. In some embodiments of the present invention, the batch or continuous recycling 123 of all or part of mother liquor 122 hack to the first solvent metal 126 can cause the element 126 to include solvent metal that is less than completely pure because of dilution with mother liquor; all variations of the steps of recycling of mother liquors are included within die scope of the present invention. All or a portion of the first mother liquor can be alternatively or additionally recycled 135 back to the second mother liquor.

In some embodiments, the steps from contacting the first silicon crystals to obtaining second silicon crystals are not performed. Thus, after the first molten mixture 112 is cooled and separated 114 into first silicon crystals 120 and a third mother liquor 116, the first silicon crystals 120 can be 121 contacted 106 with a first solvent metal 126 to form a third mixture 128. The third mixture 128 can be melted 110 to form a third molten mixture 130. The third molten mixture 130 can then be cooled and separated 114 into third silicon crystals 132 and the first mother liquor 122. The first mother liquor 122 can then be directed back 134 in the process to contact the first silicon crystals 120. All or a portion of the first mother liquor 122 can be recycled 123 back to the first mother liquor.

Creating the first silicon crystals 120 can be called the first pass. Forming the second silicon crystals 124 can be called the second pass. Similarly, the part of the method forming the third silicon crystals 132 can be called the third pass. There is no limit to the number of passes envisioned within the method of the present invention.

A repeated pass can be performed in order to more efficiently use the mother liquor by increasing the number of crystallizations achieved from a mother liquor, by increasing the amount of silicon recovered from the mother liquor, or by increasing the yield of silicon crystals before entering the next pass in the process, and there is no limit to the number of repetitions of a pass envisioned within the method of the present invention. If a repeated pass is performed, the respective mother liquor can be reused in all or in part in repetitions of that pass. A repeated pass can be performed sequentially, or in parallel. If a repeated pass is performed sequentially, it can be performed in one single container, or it can be performed in several containers in sequence. If a repeated pass is performed in parallel, several containers can be used, allowing several crystallizations to occur in parallel. The terms "sequence" and "parallel" are not intended to rigidly restrict the order in which the steps are performed, by rather to approximately describe doing steps one at a time or near to the same time.

A repeated pass, e.g. a repetition of the first, second, third, or of any pass, can more efficiently make use of several mother liquors of decreasing purity including by reusing all or part of a mother liquor in a pass. To make an existing mother liquor more pure, one way can be to add additional solvent metal (that is more pure than the mother liquor) to the mother liquor. Adding another more pure mother liquor to the mother liquor can be another way to increase its purity, such as that derived from, e.g., a later crystallization step in the process. Part or all of the mother liquor that has been used in a particular pass can also be discarded or used in an earlier pass or used in an earlier repetition of the same pass.

One possible reason for the repetition of passes and corresponding reuse of mother liquors can be to make the mass balance for the cascading steps even out for part or all of the entire process. Silicon of suitable purity can be added to any stage of the cascade, and can be added with or without silicon from a prior pass, and as with the repetition of the steps, one possible reason to do this can be to make the mass balance of the cascading steps balance in part or in whole.

The mother liquor can be entirety reused without any enhancement of purity of the mother liquor in a repeated pass. Alternatively, the mother liquor can be partially reused with enhancement of purity in a repeated pass, using more pure solvent metal or mother liquor from a subsequent step to enhance the purity of the mother liquor. For example, a first pass could be repeated in parallel, using two different containers, with mother liquor flowing toward the beginning of the process from the first instance of the pass to the first repetition of the pass, with silicon being added to both the first instance of the pass and the repeated instance of the pass, and with silicon being removed from both the first instance of the pass and the repetition of the pass to be carried on to subsequent passes. In another example, a first pass could be repeated in parallel, using two different containers, with part of the mother liquor flowing towards the beginning of the process from the first instance of the pass to the first repetition of the pass, and with another part of the mother liquor flowing towards the beginning of the process to a prior step without being reused in the repetition of the pass, with silicon being added to both the first instance of the pass and the repeated instance of the pass, and with silicon being removed from both the first instance of the pass and the repetition of the pass to be carried on to subsequent passes.

Also, a first pass could be repeated in sequence, using one container, in which after the first crystallization and separation, part of the used mother liquor from that pass is retained for reuse and some mother liquor from a later pass is added, and in the repeated pass another crystallization is performed with additional silicon. After the repetition, the mother liquor can entirely move on to another prior step. Alternatively, after the repetition, only part of the mother can move on to another prior step, with the rest of the mother liquor being retained for reuse in the pass. At least part of the mother liquor should eventually be moved on to a prior step, otherwise the impurities of that mother liquor can build to intolerable and also the mass balance of the cascade can be difficult to maintain. In another example, a first pass could be repeated in sequence, using one container, in which after the first crystallization and separation, all of the used mother liquor from that pass is retained for reuse in the repeated pass, and in the repeated pass another crystallization is performed with additional silicon.

A subsequent pass can be performed in the same or different container or as the prior pass. For example, the first pass can occur in the same container as the second pass. Or, the first pass can occur in a different container as the second pass. A pass can be repeated in the same container. For example, the first instance of the first pass could occur in a particular container, and then the first repetition of the first pass could occur in the same container. The economies of large scale processing can make reuse of the same container for multiple subsequent or simultaneous passes advantageous in some embodiments. In some embodiments, it can be economically beneficial to move a liquid from container to container rather than to move a solid, therefore embodiments of the present invention encompass alt variations of the reuse of containers and also all variations of the use of different containers. Therefore, a subsequent pass can be performed in a different container as the prior pass. A repeated pass can be performed in the same container as an earlier performance of that pass.

The impurities of the mother liquor as it moves towards the beginning of the process grow to higher concentrations in boron and in other impurities. The mother liquors can be reused as needed in each step of the crystallization (forming the crystals) to balance the mass throughout of the process. The number of reuses can be a function of the solvent metal (e.g., aluminum) to silicon ratio utilized, the desired chemistry, and the desired throughput of the system.

After forming crystals in any of the above mentioned steps, the solvent metal can be dissolved or otherwise removed from the crystals by using an acid, base or other chemical. Any remaining solvent metal or foreign contaminant can be removed by mechanical means as well. Hydrochloric acid (HCl) can be used to dissolve solvent metal off of cascaded flakes or crystals. Spent HCl can be sold as polyaluminum chloride (PAC) or aluminum chloride to, among other things, treat waste water or drinking water. To dissolve aluminum off of flakes, a counter-current system can be used with multiple tanks moving flakes from clean to dirty, and acid from clean to spent, in opposite directions. A bag house can be used to pull loose powder away from flakes and V-grooved slots and vibration can be used to separate balls of powder, foreign contaminates or non-dissolved aluminum from the flakes after the acid leaching.

The crystals or flakes can be further melted. A gas or stag can be contacted with the molten silicon. About 0.5-50 wt % slag can be added to the silicon. A slag containing some amount of $SiO_2$ can be utilized, for example. Flakes can be melted in a furnace, which can include slag addition, and slag addition can occur before or after flake melting. Flakes can be melted using slag addition. Flakes can be melted under vacuum, inert atmosphere or standard atmosphere. Argon can be pumped through the furnace to create an argon blanket or a vacuum furnace can be used. The flakes can be melted to above about 1410° C. The molten silicon can be held between about 1450° C. and about 1700° C. Slag or dross can be removed from the surface of the bath during slagging, while holding the silicon molten in the furnace, or during gas injection. The molten silicon can be then poured into a mold for directional solidification. The molten silicon can be filtered through a ceramic filter first.

The silicon can then be directionally solidified, for example. After cooling, a portion of the "last-to-freeze" silicon can be removed. "Last-to-freeze" silicon can refer to silicon that solidifies last in the sample ingot or boule and contains the most impurities; therefore, removal of this portion of the silicon can help to produce silicon that is overall more pure. About 5 to about 30% of the last-to-freeze silicon can be removed. The ingot can be directionally solidified by applying a temperature gradient on the silicon as it freezes. The silicon can be directionally solidified into a large 1-3 ton ingot. The silicon can be directionally solidified from the bottom of the ingot to the top. Heat can be provided on the top of the ingot to form or aid in forming the temperature gradient, for example, or cooling can be provided on the bottom of the ingot to form or aid in forming the temperature gradient. The solidification process can be repeated one or more times by directionally solidifying from bottom to top and removing about 5% to about 30% of the top of the silicon ingot. The top of the ingot, before it has frozen, can be poured off. The last-to-freeze section can be cut off or can be broken off by chunking. The last-to-freeze silicon can be recycled back into the process at any pass. The sides and bottoms of the directionally solidified ingot can be cut off and recycled back into the process. The surface of the silicon can be blasted with media and or etched between any of the steps. Each additional directional solidification step further purifies the silicon on account of, for example, the differing segregation coefficient of each element. Any of the above steps can be repeated one or more times.

The feedstock or metallurgical grade silicon can include less than about 15 ppmw boron, less than about 10 ppmw boron, or less than about 6 ppmw boron, for example. The solvent metal can be aluminum. The aluminum can be P1020 aluminum and include a boron level of less than about 1.0 ppmw, less than about 0.6 ppmw, or less than about 0.4 ppmw.

The mother liquor can be filtered with a ceramic foam filter or can be gas injected at any stage of the process. Ceramic Materials low in contaminates, such as boron or phosphorus, are examples of materials that can be used to hold and melt the molten silicon. The gas can be oxygen, argon, water, hydrogen, nitrogen, chlorine, or other gases that contain these compounds can be used, or a combination thereof, for example. The gas can be injected through a lance, rotary degasser, or porous plug into the molten silicon, 100% Oxygen gas can be injected into the molten silicon, 1 Gas can be injected for about 30 minutes to about 12 hours. Gases can be injected before, after, or during slagging. The gas can be 100% oxygen injected at 30-40 L/min through a lance into the molten silicon for 4 hours.

Figure 2:
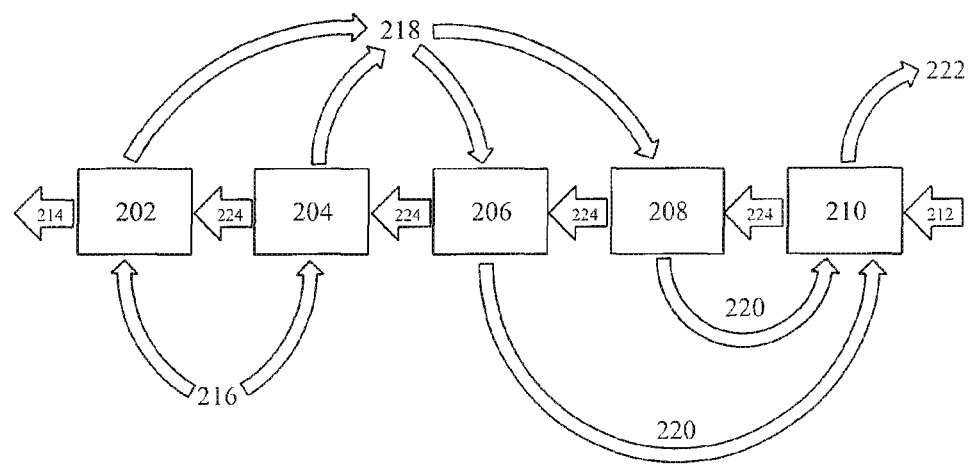
FIG. 2 illustrates a diagram of a method of purifying a material utilizing a triple pass cascade process, according to some embodiments.
Figure 4:
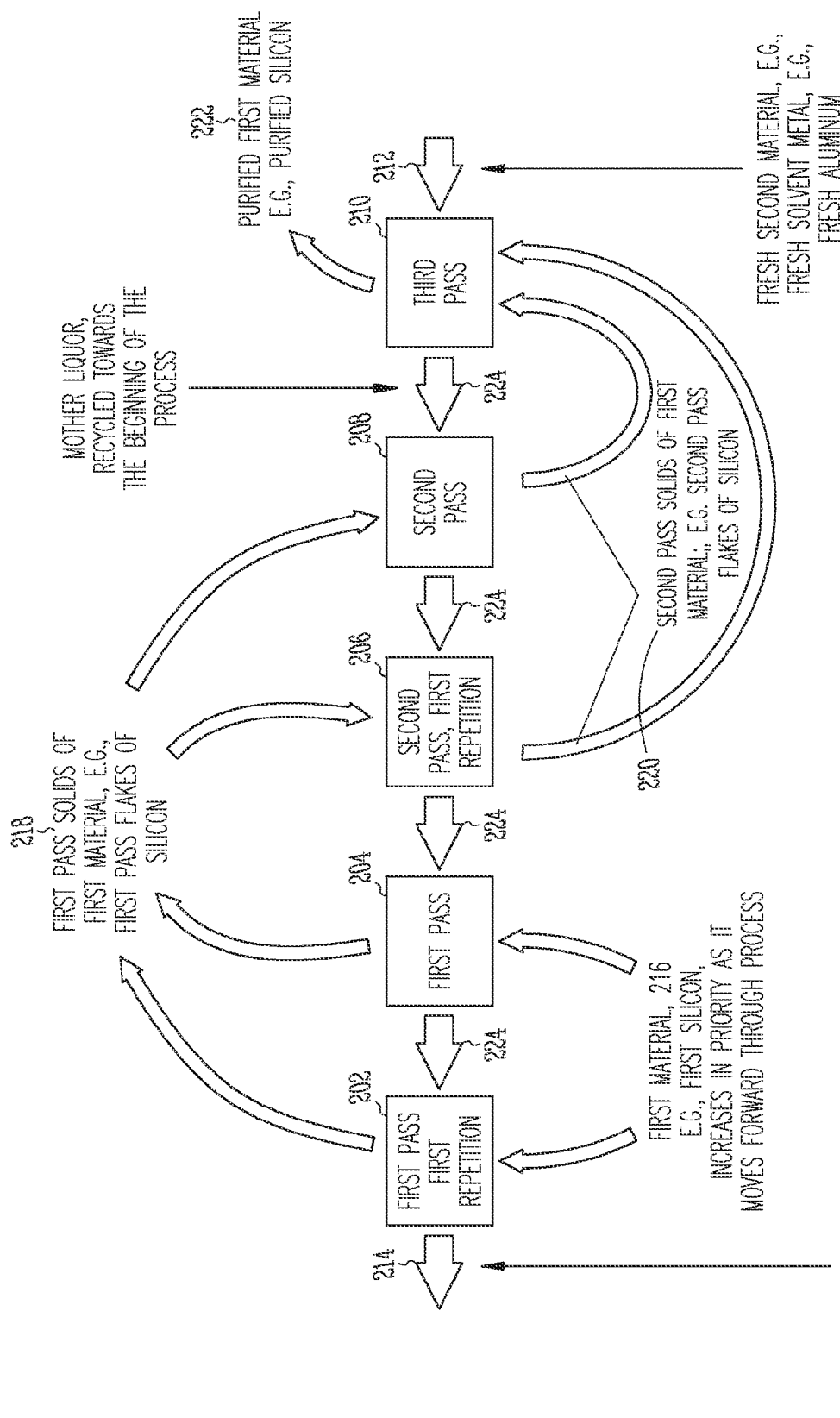
FIG. 4 illustrates a diagram of a method of purifying silicon utilizing a triple pass cascade process, according to some embodiments.

Referring to FIGS. 2 and 4, a diagram 200 of a method of purifying a first material utilizing a triple pass cascade is shown, according to some embodiments. In a specific embodiment, the first material is silicon, and the solvent metal is aluminum. Silicon 216 can be fed into the beginning of a first pass 204 purifying process. Silicon 216 can be subsequently or simultaneously fed into a first repetition of the first pass 202 process. First pass 202 and 204 can be performed in the same furnace sequentially where some percentage of mother liquor 224 is placed back into or left in the same furnace and some percentage of mother liquor 214 is removed. Alternatively, first pass 202 and 204 can be performed in different furnaces. The resultant flakes from the single pass can either be removed from each of 202 and 204 and combined into 218, or the flakes resulting from process 202 can be fed into process 204, and the flakes resulting from process 204 become flakes 218. The resultant single pass flakes 218 can be fed into second pass 208 and 206 processes, which result in second pass flakes 220. Second pass 206 and 208 can be performed in the same furnace. Sequentially, some percentage of mother liquor 224 can be remelted in the furnace and some percentage of mother liquor 224 can be sent to the single pass 204. Second pass 206 and 208 can be performed in difference furnaces. FIGS. 2 and 4 illustrates flakes 218 entering the first instance of the second pass 208 and the first repetition of the second pass 206 simultaneously, as well as second pass flakes 220 leaving both process steps 202 and 204 to enter the third pass 210; however, the steps can occur in series. The second pass flakes 220 can then be fed into a third pass 210 purifying process to produce third pass flakes 222. New solvent metal 212 starts in the process at the third pass 210 and is fed through the process in mother liquor 224 in the opposite direction as the silicon, resulting in a eutectic or mother liquor 214 that can be sold off as a useful by-product. In this way, the solvent metal in the mother liquor 224 decreases in purity and runs through the system in the opposite direction as the silicon 218, 220, 222, which increases in purity.

The silicon purified by the methods described above can be suitable for use in photovoltaic devices and can contain less boron than phosphorous in ppmw. In some embodiments, it is advantageous to have a higher boron level than phosphorous level in the UMG if the boron level is low enough because it allows the blending of the UMG with polysilicon from the Siemens process and achievement of a higher yield and cell efficiency. Polysilicon from the Siemens process generally has boron and phosphorous levels below about 0.1 ppmw. Blending the UMG with polysilicon having boron and phosphorus levels lower than the UMG reduces the average phosphorus and boron level in the blended UMG/polysilicon. Therefore, the multicrystalline ingot made from UMG with higher boron than phosphorous levels can have P/N junctions closer to the surface in the multicrystalline ingot than a multicrystalline ingot made from UMG silicon with lower boron than phosphorous levels. If the boron level is low enough and the phosphorous level is less than the boron level, it is possible to not have a P/N junction at all, UMG silicon that has higher levels of phosphorous than boron tends to have a P/N junction deeper and further from the surface in the multicrystalline ingot which limits the yield of useful material from the ingot. It can be advantageous in some embodiments if the boron content is tower than about 0.7 ppmw because a higher minimum resistivity can then be obtained at and near the bottom of a multicrystalline ingot grown from the UMG or blended UMG. UMG silicon that has higher levels of either boron and/or phosphorous than 0.7 ppmw is usually compensated to increase the resistivity of the wafers to improve cell efficiencies. UMG silicon that has higher levels of either boron and/or phosphorous than 0.3 ppmw can be compensated to increase the resistivity of the wafers to improve cell efficiencies. Compensation improves average cell efficiency but tends to prevent UMG from having comparable cell efficiencies to polysilicon from the Siemens process due to reduced carrier mobility and increased recombination via mechanisms such as Auger Recombination. The purified silicon with lower phosphorous than boron levels can also be processed into solar cells without blending with polysilicon. In some embodiments, it is possible to not add any dopant, either boron or phosphorous, with solar silicon made from this process. Purified UMG silicon made from metallurgical processes with boron less than the phosphorous in ppmw, boron less than 0.7 ppmw, and other metallic impurities less than 1 ppmw can be used to make solar cells.

Purified UMG silicon made from a metallurgical process with a phosphorous level of about 0.2 ppmw and a boron level of about 0.5 ppmw with other impurities less than 1 ppmw can produce average cell efficiencies between 15.0 and 15.5%. With current standard cell processes purified UMG silicon made from a metallurgical process with a phosphorous level of about 0.40 ppmw and a boron level of about 0.45 ppmw with other impurities less than 0.2 ppmw can produce average cell efficiencies between 15.5 and 16.3% with optimized cell architectures. UMG silicon with a phosphorous level of 2.5 ppmw and a boron level of 1.0 ppmw and other metals below the detection limit for glow discharge mass spectrometer (GDMS), a standard cell line without special processes for UMG can produce cells with efficiency between 14.3-15.0%. Thus, it can be beneficial that the level of phosphorous is less than the level of boron, because of resulting acceptable resistivities and high enough carrier mobility to get good average cell efficiencies.

Other Metals

Figure 3:
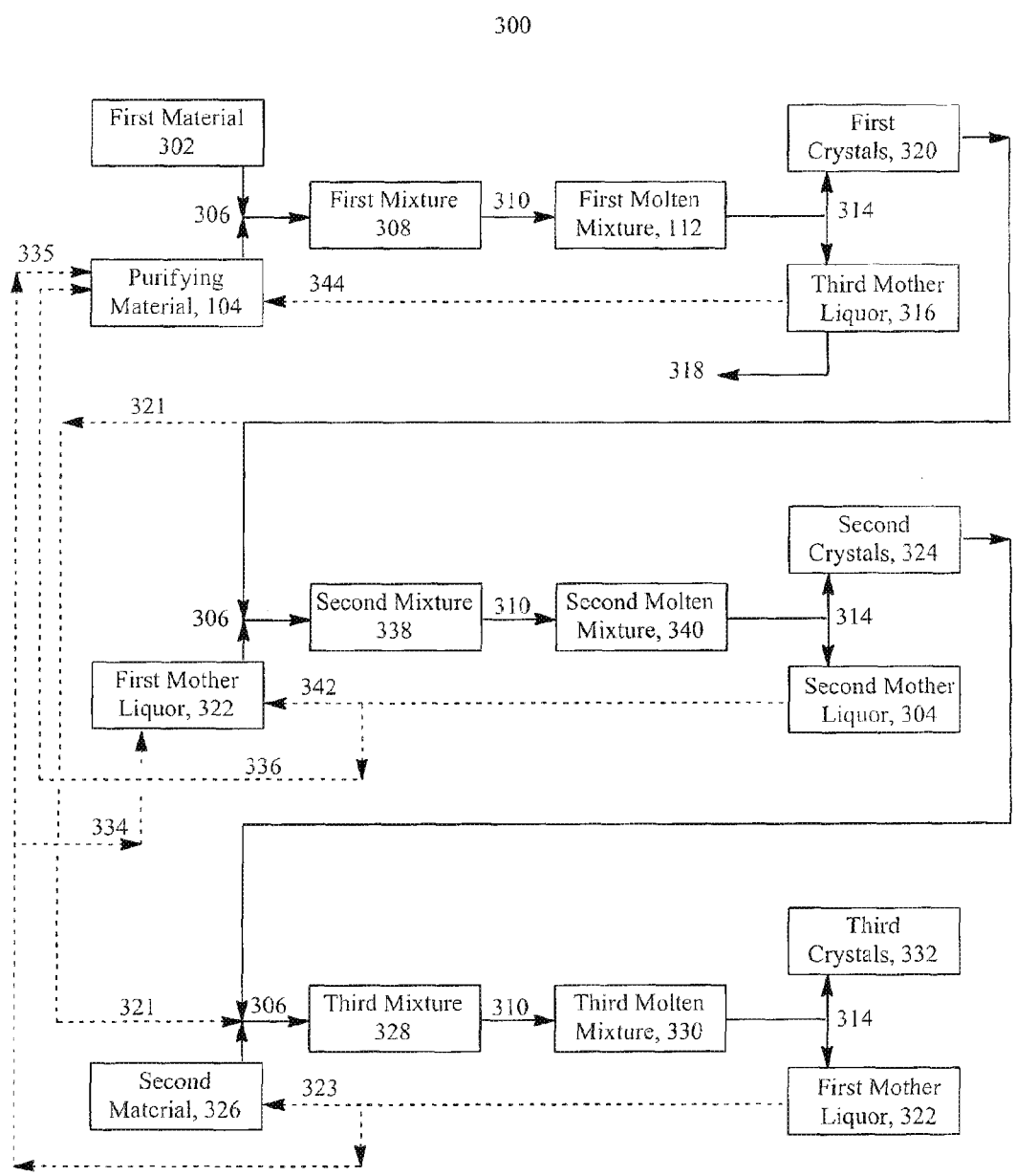
FIG. 3 illustrates a block flow diagram of a method of purifying a material utilizing a triple pass cascade process, according to some embodiments.

The present invention includes methods for purifying a first material by using crystallization from a metallic purifying material. It will be recognized by one of skill in the art that the preceding discussion that referred to silicon as a material to be purified, and aluminum or other metal solvents as the purifying material, can be applied to purifying a first material by using crystallization from a metallic purifying material. Referring to FIG. 3, a block flow diagram 300 of a method of purifying a material utilizing a cascade process is shown, according to some embodiments. A first material 302 can contact 306 a purifying material 304 to form a first mixture 308. The purifying material 304 can be a second mother liquor in some embodiments. The first mixture 308 can be melted 310 to form a first molten mixture 312. The first molten mixture 312 can then be cooled and separated 314 into first crystals of the first material 320 and a third mother liquor 316. The third mother liquor 316 can then be removed from the process and sold 318 for use in other industries or all or a portion of it can be recycled 344 back with purifying material 304, which can be a second mother liquor. One example of an industry for which the third mother liquor 316 would be of use would be the metal foundry industry for use in metal alloys for castings.

One of skill in the art wilt recognize that all of the various manners and techniques described above in the description of FIG. 1 with regard to the specific embodiment of purification of silicon apply equally to the general concept of purifying a first material using a metallic solvent, as shown in FIG. 3; therefore, those discussions are integrated herein as applicable as a part of the description of FIG. 3. Thus, the contacting of the first material, or crystals of the first material can occur in any suitable manner known to those of skill in the art. Similarly, optional stirring or agitation steps can be performed in any suitable manner known in the art. The melting of a mixture of first material or first material crystals can occur in any suitable manner known in the art. Methods of adding heat to a mixture include any suitable method known by those of skill in the art. The cooling of the molten mixture can be conducted in any suitable manner known to those of skill in the art. The mother liquor resulting from the cooling of a molten mixture and subsequent separation of crystals of the first material and the mother liquor is envisioned to be optionally recycled to any prior step in the process. All degrees of and variations of the recycling of mother liquors are encompassed within the scope of the present invention. The separation of the mother liquor from the first material solids can take place by any suitable method known to those of skill in the art.

In one embodiment, the first crystals of the first material 320 can then be optionally contacted 306 with a first mother liquor 322 to form a second mixture 338. The second mixture 338 can be optionally melted to form a second molten mixture 340. The second molten mixture can be optionally cooled and separated 314 into second crystals of the first material 324 and the second mother liquor 304. The second mother liquor 304 can then be directed back 336 in the process to contact a first material 302 or all or a portion of the second mother liquor 304 can be recycled 342 back to the first mother liquor 322. The steps from contacting the first crystals of the first material to obtaining second crystals of the first material are optional, in that they can be either not performed or these steps can be performed a number of times (e.g. 1, 2, 3, 4 times, etc.). If these steps are not performed 321, first crystals of the first material 320 are then subsequently contacted with first solvent metal 326.

In another embodiment, the steps from contacting the first crystals of the first material to obtaining second crystals of the first material are performed. In these embodiments, step 321 is not performed. Thus, after the first molten mixture 312 is cooled and separated 314 into first crystals of the first material 320 and a third mother liquor 316, the first crystals of the first material 320 can then be contacted 306 with a first mother liquor 322 to form a second mixture 338. The second mixture 338 can be melted to form a second molten mixture 140. The second molten mixture can be cooled and separated 314 into second crystals of the first material 324 and the second mother liquor 304. The second mother liquor 304 can then be directed back 336 in the process to contact a first material 302 or all or a portion of the second mother liquor 304 can be recycled 342 back to the first mother liquor 322.

In another embodiment, the steps from contacting the first crystals of the first material to obtaining second crystals of the first material are independently either performed or not performed. Thus, after the first molten mixture 312 is cooled and separated 314 into first crystals of the first material 320 and a third mother liquor 316, the first crystals of the first material 320 can then be optionally contacted 306 with a first mother liquor 322 to form a second mixture 338, or alternatively, the first crystals of the first material 320 can then be contacted 306 with a first mother liquor 322 to form a second mixture 338. The second mixture 338 can be optionally melted to form a second molten mixture 340, or alternatively, the second mixture 338 can be melted to form a second molten mixture 340. The second molten mixture can be optionally cooled and separated 314 into second crystals of the first material 324 and the second mother liquor 304, or alternatively, the second molten mixture can be cooled and separated 314 into second crystals of the first material 324 and the second mother liquor 304. The second mother liquor 304 can then be directed back 336 in the process to contact a first material 302 or all or a portion of the second mother liquor 304 can be recycled 342 back to the first mother liquor 322.

The second crystals of the first material 324 can be contacted 306 with a second material 326 to form a third mixture 328. The third mixture 328 can be melted 310 to form a third molten mixture 330. The third molten mixture 330 can then be cooled and separated 314 into third crystals of the first material 332 and the first mother liquor 322. All or a portion of the first mother liquor 322 can then be directed back 334 in the process to contact the first crystals of the first material 320. All or a portion of the first mother liquor 322 can be recycled 323 back to the second material 326. In some embodiments of the present invention, the batch or continuous recycling 323 of all or part of mother liquor 322 back to the second material 326 can cause the element 326 to include second material that is less than completely pure because of dilution with mother liquor; all variations of the steps of recycling of mother liquors are included within the scope of the present invention. All or a portion of the first mother liquor can be alternatively or additionally recycled 335 back to the purifying material 304, which can be a second mother liquor.

In some embodiments, the steps from contacting the first crystals of the first material to obtaining second crystals of the first material are not performed. Thus, after the first molten mixture 312 is cooled and separated 314 into first crystals of the first material 320 and a third mother liquor 316, the first crystals of the first material 320 can be 321 contacted 306 with a second material 326 to form a third mixture 328. The third mixture 328 can be melted 310 to form a third molten mixture 330. The third molten mixture 330 can then be cooled and separated 314 into third crystals of the first material 332 and the first mother liquor 322. The first mother liquor 322 can then be directed back 334 in the process to contact the first crystals of the first material 320. All or a portion of the first mother liquor 322 can be recycled 323 back to the first mother liquor.

Creating the first crystals of the first material 320 can be called the first pass. A repeated single pass can be performed in order to increase the yield of first crystals of the first material before entering the next pass in the process, or to more efficiently use the mother liquor (e.g. to increase the number of crystallizations achieved from a mother liquor), and there is no limit to the number of repetitions of a pass within the method of the present invention. If a repeated pass is performed, the respective mother liquor can be reused in all or in part in repetitions of that pass. Forming the second crystals of the first material 324 can be called the second pass. Similarly, the part of the method forming the third crystals of the first material 332 can be called the third pass. There is no limit to the number of passes envisioned within the method of the present invention.

One of skill in the art will recognize that the description above pertaining to subsequent or parallel repeated or multiple passes with regard to purification of silicon applies generally to the purification of a first material with a metallic solvent; therefore, that description is incorporated herein as applicable. Thus, the method of the present invention provides that a subsequent or parallel repeated single pass, or a repeated pass of the second or third or of any pass, can create further purified crystals of the first material by crystallizing the first material from an optionally more pure mother liquor, or can more efficiently make use of mother liquors of decreasing purity. The step of separation 314 can be skipped or only a partial separation can take place until all repetitions of a particular pass have finished; thus, first crystals of the first material 320 can be created without the step of separating 314. The step of separation 314 can be used for each repetition of a particular pass to give multiple parallel or sequential batches of crystals of the first material. The first material can be removed from any part of a simultaneous or sequential repeated pass. The mother liquor can be entirely or partially reused with or without enhancement of purity of the mother liquor in a repeated pass. Embodiments of the present invention encompass carrying the first material through each repetition of a pass. The same or different containers can be used for the repetition of a pass. The same of different containers can be used for different passes. The mother liquor can be reused several times in each step. First material of suitable purity can be added in any step, and the mother liquors can be reused as needed in each step of the crystallization of the first material, including to balance the mass throughout the process. The number of reuses can be a function of the second material to first material ratio utilized, the desired chemistry, and the desired throughput of the system.

After forming crystals of the first material, the second material can be dissolved or otherwise removed from the crystals by using an acid, base or other chemical. Any remaining solvent metal or foreign contaminant can be removed by mechanical means as well. Bi-products can be sold to various industries. To dissolve the second material off of crystals of the first material, a counter-current system can be used with multiple tanks moving crystals from clean to dirty, and acid or any other suitable chemical to remove the second material from clean to spent, in opposite directions.

The crystals of the first material can be further melted. The first material can then be directionally solidified. After cooling, a portion of the last-to-crystallize first material can be removed. The mother liquors can be filtered with a ceramic foam filter or can injected at any stage of the process. Any suitable ceramic material can be used to hold the molten mother liquor or mixture or molten first material. Gas can be injected into mother liquor or the molten first material, or into the second element.

Referring to FIG. 2, a diagram 200 of a method of purifying a first material utilizing a triple pass cascade is shown, according to some embodiments. First material 216 can be fed into the beginning of a first pass 204 purifying process. First material 216 can be subsequently or simultaneously fed into a first repetition of the first pass 202 process. First pass 202 and 204 can be performed in the same furnace sequentially where some percentage of mother liquor 224 is placed back into or left in the same furnace and some percentage of mother liquor 214 is removed. Alternatively, first pass 202 and 204 can be performed in different furnaces. The resultant crystals from the single pass can be removed from each of 202 and 204 and combined into 218. The resultant single pass solids of the first material 218 can be fed into second pass 208 and 206 processes, which result in second pass solids of the first material 220. Second pass 206 and 208 can be performed in the same furnace. Sequentially, some percentage of mother liquor 224 can be remelted in the furnace and some percentage of mother liquor 224 can be sent to the single pass 204. Second pass 206 and 208 can be performed in difference furnaces. FIG. 2 illustrates solids 218 entering the first instance of the second pass 208 and the first repetition of the second pass 206 in parallel, as well as second pass solids 220 leaving both process steps 202 and 204 to enter the third pass 210; however, the steps can occur in series. The second pass solids 220 can then be fed into a third pass 210 purifying process to produce third pass solids 222. New second material 212 starts in the process at the third pass 210 and is fed through the process in mother liquor 224 in the opposite direction as the first material, resulting in a eutectic or mother liquor 214 that can be sold off as a useful by-product. In this way, the second material in the mother liquor 224 decreases in purity and runs through the system in the opposite direction as the first material 218, 220, 222, which increases in purity.

One of ordinary skill in the art will recognize that due to the complexity of embodiments of the present invention, and due to the nature of the invention, mother liquor from sequentially later steps in the invention is used in earlier steps to purify the silicon. As in many processes of a semi-continuous nature, reaching a steady-state does not occur immediately after the start-up of the process. Therefore, upon starting up the cascade process from scratch, in order to generate mother liquor from later steps to use in the first steps of the cascade, several initial crystallization steps can be performed.

All publications, patents, and patent applications are incorporated herein by reference. While in the foregoing specification this disclosed subject matter has been described in relation to certain preferred embodiments thereof, and many details have been set forth for purposes of illustration, it will be apparent to those skilled in the art that the disclosed subject matter is susceptible to additional embodiments and that certain of the details described herein can be varied considerably without departing from the basic principles of the disclosed subject matter.

Example 1

A single pass mother liquor A was mixed with MG-Si or other silicon feed stock. A molten mixture SP (single pass) B was cooled to grow silicon crystals "SP flakes B" and SP mother liquor B, SP mother liquor B and SP flakes B were separated. The SP mother liquor B was sold as a byproduct to aluminum foundry, die-cast and secondary smelting industry. The mixture was about 40% silicon and 60% aluminum. The mixture was melted to about the liquidus temperature. The mixture was heated to above about 950° C. The mixture was cooled to about 720° C. The mixture yielded about 32% flakes by weight. Cooling took place over about 15 hours. About 2,200 kg or more was used as a batch size.

Double pass (DP) mother liquor B was mixed with MG-Si or other source of silicon. A molten mixture SP A was cooled to grow silicon crystals SP flakes A and SP mother liquor A. The SP mother liquor A and SP flakes A were separated.

The SP A flakes and/or SP B flakes and DP mother liquor A were mixed. Molten mixture 3 "DP B" was cooled to grow silicon crystals DP flakes B and DP mother liquor B. The DP mother liquor B and DP flakes B were separated.

The SP A flakes and/or SP B flakes and mother liquor TP were mixed. Molten mixture 4 "DP A" was cooled to grow silicon crystals DP flakes A and DP mother liquor A. The DP mother liquor A and DP flakes A were mixed.

The DP A flakes and/or DP B flakes and aluminum were mixed. Molten mixture 5 "TP" was slowly dropped in temperature to grow silicon crystals TP flakes A and TP mother liquor. The TP mother liquor and TP flakes were separated.

The aluminum was dissolved off of TP flakes using HCl and the flakes were placed in plastic baskets with water and HO and reacted with progressively stronger HCl to dissolve the aluminum into polyaluminum chloride. The polyaluminum chloride was sold as a byproduct for waste or drinking water treatment. The reaction was done between 50-90° C. using heat from the exothermic reaction of the HCl with the aluminum. The flakes were rinsed with water after the HCl reaction. The flakes were dried to remove any traces of the rinsewater.

Any powder or any remaining aluminum and/or foreign contaminate were mechanically removed. The flakes were vibrated over a screen or grate and a bag house was used to pull silicon powder away from flakes. A series of grates was used to separate the flakes from powder balls, refractory contamination, or other foreign objects. The powdered silicon was sold as a byproduct The flakes were melted with slag into the molten silicon. The slag was a mixture of $NaCO_3+CaO+SiO_2$ at 7% by weight of the silicon. The slag can be skimmed off the surface of the bath before pouring. The silicon can be poured through a ceramic foam filter A 1.5 ton ingot was directionally solidified from bottom to top. A top heater was used and more thermally conductive bottom than side insulation used on the mold. A fan was used to cool the bottom of the mold. The top can be cut off with a band saw or circular saw with a diamond coated blade. The top can be poured off while it is still liquid. Top or last-to-freeze silicon can be broken off with chunking from mechanical blows or by thermal quenching. The ingot can be blasted with $Al_2O_3$ media to clean the surface. The top of the last-to-freeze silicon was cut off. The directional solidification and last-to-freeze removal processes were repeated two times.

In one embodiment, the process can produce purified silicon with boron levels less than 0.75, aluminum levels less than 1.0, phosphorous levels less than 0.8 and other metallic element levels totaling less than 1 ppmw. In another embodiment, the process can produce purified silicon with boron levels less than 0.5, aluminum levels less than 0.5, phosphorous levels less than 0.5, metal levels less than 0.25 ppmw and other element levels totaling less than 1 ppmw. Phosphorous or other N-type dopants can be added to increase the resistivity of the silicon to 0.30 or greater ohm/cm. The process can be used to produce more than 20 tons per month. Other metallic impurities can include one or more of magnesium, titanium, manganese, iron, cobalt, nickel, copper, zinc, molybdenum, cadmium, tin, tungsten, lead and uranium.

Silicon from the process, such as last-to-freeze silicon, spills, or scrap can be recycled in the process by placing them back in the process at the same step or an earlier step.

The silicon produced from the process was tested with SIMS (secondary ion mass spectrometry) and had Ca <0.0001, Al <0.01, P 0.172, B 0.623, C 5.205 and O 3.771 pppmw. The silicon was tested with GDMS and had B 0.77, Al 0.22, P 0.26 ppmw and all other tested elements below detection limit. The phosphorous level is lower than boron in ppmw in the purified silicon.

Example 2

A SP mother liquor A was mixed with MG-Si or other source of silicon. A molten mixture "SP B" was dropped in temperature to grow silicon crystals "SP flakes B" and SP mother liquor B. The SP mother liquor B and SP flakes B were separated.

A DP mother liquor was mixed with MG-Si or other source of silicon. A molten mixture "SP A" was cooled to grow silicon crystals "SP flakes A" and SP mother liquor A. The SP mother liquor A and SP flakes A were separated.

The SP A flakes and/or SP B flakes were mixed with aluminum. A molten mixture "DP" was slowly dropped in temperature to grow silicon crystals "DP flakes A" and DP mother liquor. The DP mother liquor and DP flakes were separated.

Aluminum was dissolved off of DP flakes using HCl. Powder and any remaining aluminum and/or foreign contaminate were mechanically removed. The flakes were melted with slag and gas was injected with oxygen into the molten silicon.

The silicon was directionally solidified. The top of the last-to-freeze silicon was cut off. Directional solidification and removal of last-to-freeze silicon was repeated two times. In one embodiment, this process produced purified silicon with P 0.29, B 1.2 and Al less than 0.01 ppmw as measured by SIMS. In another embodiment, this process produced purified silicon with P 0.40, B 0.88 and Al less than 0.01 ppmw as measured by SIMS.

This process with 2 directional solidifications produced purified silicon with P 0.40, B 0.40 and Al 0.86 ppmw as measured by SIMS. The process can reduce the aluminum level below the detection limit of GDMS with only 2 directional solidifications.

Example 3

Figure 7:
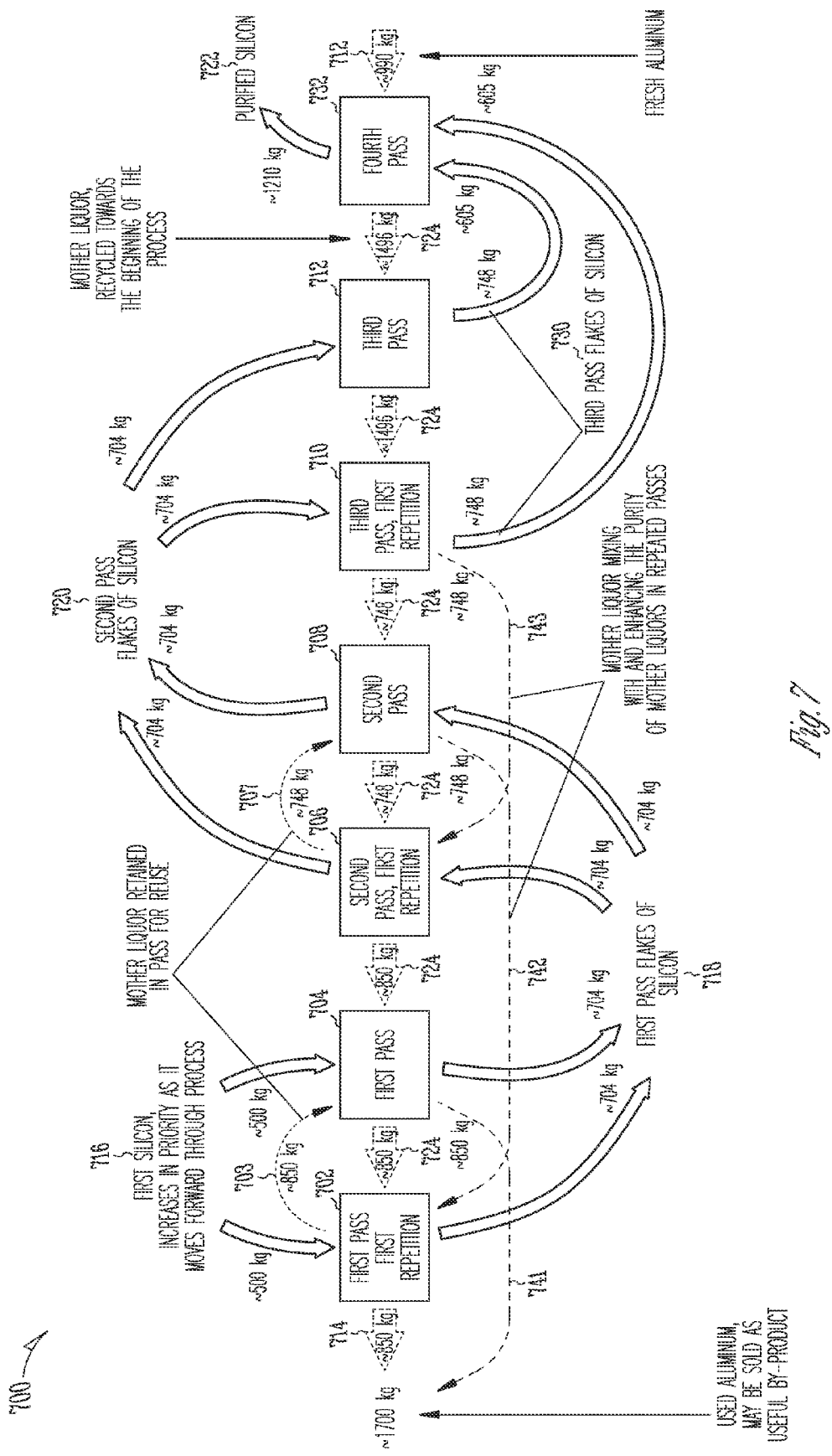
FIG. 7 illustrates a diagram of a method of purifying silicon utilizing a quadruple pass cascade process, according to some embodiments.

FIG. 7 shows an embodiment of the present invention as a quad pass cascade, performed with four furnaces to produce quad pass silicon flakes 722 with less than 0.52 ppmw Boron. The single pass furnace has a holding capacity of 10,000 kg. For the first pass 704, 2,200 kg of molten 60% aluminum and 40% silicon (850 kg mother liquor 724 from the second pass, 850 kg reused mother liquor 703 from the first repetition of the first pass 702, and 500 kg silicon 716) is poured into a container which can hold the molten mixture where it is allowed to cool for approximately 16 hours, this produces about 704 kg first pass flakes 718 of silicon. Optional gas containing chlorine can be added to the molten mixture before cooling. About 50% of the liquid mother liquor 741 is poured off into sow moulds to be sold for making aluminum foundry alloys as a by-product. The other 50% of the mother liquor 724 (from the first pass 704) or 850 kg is poured back in liquid form or added as solid sows back into the same single pass furnace for the first repetition of the first pass 702. Also 850 kg of second pass mother liquor 742 as liquid or solid is added into the single pass furnace for the first repetition of the first pass 702, along with 500 kg silicon 716. This produces approximately 704 kg of single pass silicon flakes 718 when the molten bath is cooled to grow flakes. For each 2,200 kg batch, 500 kg of metallurgical grade silicon or scrap silicon 716 is added into the furnace. The scrap silicon, silicon purified from another process or metallurgical silicon should have a boron level of approximately less than 5 ppmw. This step is done twice (e.g., the first pass 704 and the first repetition of the first pass 702) in each complete cycle to have balanced amounts of mother liquor and flakes in the process.

Next, in the double pass furnace which has a holding capacity of 10,000 kg, for the second pass 708, 704 kg of single pass flakes 718 are melted with 1,496 kg of mother liquor, 50% mother liquor from a double pass heat (about 748 kg, 724, from second pass 708) and 50% mother liquor from a triple pass heat (about 748 kg, 743) that has been used twice in the triple pass furnace. This produces 704 kg of double pass flakes 720. The mother liquors can be added to the furnaces in liquid or solid form. Half of the 1496 kg mother liquor is used 724 (from second pass 708) for the first repetition of the second pass 706, and the other half of the mother liquor 742 is used to enhance the purity of the mother liquor in the first repetition of the first pass 702. After the repetition of the second pass 706, half of the mother liquor 707 is reused in the second pass 708, and the other half 724 (from repetition of second pass 706) is used in the first pass 704. Scrap silicon can be added to the furnace instead of single pass flakes 718 and should have a boron level less than 2.1 ppmw. As in the first pass, this step is done twice in each complete cycle (e.g., second pass 708, and first repetition of the second pass 706) but can be done 1 or more times to adjust the mass balances and number of times the mother liquor is used.

Next, the triple pass furnace is used which has a holding capacity of 2,200 kg. For the third pass 712, 704 kg of double pass flakes 720 are melted with 1,496 kg of quad pass mother liquor 724. This produces 704 kg of triple pass flakes 730 and 1,496 kg of triple pass mother liquor 724 that has been used once. The triple pass mother liquor 724 (from third pass 712) is completely reused in the same furnace for the first repetition of the third pass 710 with 704 kg of double pass flakes 720. This produces 704 kg of triple pass flakes 730 and 1,496 kg of triple pass mother liquor (724 (from first repetition of the third pass 710) and 743) that has been used twice. Instead of using double pass flakes 720, scrap silicon can be used with boron level less than 1.3 ppmw.

Next, the quad pass furnace is used which has a holding capacity of 2,200 kg. 1,210 kg of triple pass flakes 730 are melted with 990 kg of aluminum 712 containing less than 0.80 ppmw boron. This produces quad pass mother liquor 724 and quad pass flakes 722. Scrap silicon can be used instead of triple pass flakes for this step with boron less than 0.80 ppmw.

Each step can be done by reusing the mother liquor or some percentage of the mother liquor one or more times. It will be clear to one of skill in the art that by adjusting the number of repetitions of the steps, by adjusting the amount of mother liquor recycled, and by adjusting the amount and source of silicon added in each step, the mass balance for the cascade 700 can be evenly balanced. The mother liquor can be used no times in a step and skipped to a lower step. Scrap silicon, metallurgical silicon or silicon purified by another method can be added at any step of the process instead of flakes for silicon units. The flake generation step can be done 2 or more times, this example shows 4 passes and 7 crystallizations in the cycle. The process can be done in difference size furnaces with different batch sizes. The ratio of silicon to aluminum can be adjusted in each step from 20-70%.

The quad pass flakes 722 are processed in HCl and water and the aluminum level is reduced to around 1000-3500 ppmw. The polyaluminum chloride that is produced can be sold as a by-product for purifying water. The quad pass flakes are then melted in a furnace where they are reacted with slag. Optionally the molten silicon can be filtered or have gases injected in it before directional solidification. Optionally the molten aluminum-silicon mixtures or mother liquors can be filtered.

The molten silicon is then directional solidified and the last to freeze section is removed. The silicon is then directionally solidified again and some portion of the last to freeze silicon is removed. Gas or compounds containing chlorine can be added to the any of the passes before growing the crystals. This process results in purified silicon with B less than 0.45 ppmw, P less than 0.60 ppmw and Al less than 0.50 ppmw. This silicon can be used to make ingots and wafers for making photovoltaic cells with high efficiency above 15.5%. This silicon can be blended with other scrap silicon or silicon purified using other methods to make a feedstock making photovoltaic ingots, wafers and cells. Examples of the purity of silicon purified in the manner of this example are given in the tables below.

TABLE 1

Bulk Analysis of B in Si
Detection limit < 0.001 ppmw

| Sample | B concentration (at/cm$^3$) Analysis 1 | B concentration (at/cm$^3$) Analysis 2 | Average (at/cm$^3$) | ppmw |
|---|---|---|---|---|
| 1 | $5.20 \times 10^{16}$ | $5.30 \times 10^{16}$ | $5.25 \times 10^{16}$ | 0.41 |
| 2 | $5.57 \times 10^{16}$ | $5.60 \times 10^{16}$ | $5.59 \times 10^{16}$ | 0.44 |
| 3 | $5.15 \times 10^{16}$ | $5.20 \times 10^{16}$ | $5.18 \times 10^{16}$ | 0.41 |

TABLE 2

Bulk Analysis of P in Si
Detection limit < 0.003 ppmw

| Sample | P concentration (at/cm$^3$) Analysis 1 | P concentration (at/cm$^3$) Analysis 2 | Average (at/cm$^3$) | ppmw |
|---|---|---|---|---|
| 1 | $1.78 \times 10^{16}$ | $1.78 \times 10^{16}$ | $1.78 \times 10^{16}$ | 0.39 |
| 2 | $2.36 \times 10^{16}$ | $2.40 \times 10^{16}$ | $2.38 \times 10^{16}$ | 0.53 |
| 3 | $2.70 \times 10^{16}$ | $2.68 \times 10^{16}$ | $2.69 \times 10^{16}$ | 0.60 |

TABLE 3

Bulk Analysis of Al in Si

| Sample | Al concentration (ppbw) Analysis 1 | Al concentration (ppbw) Analysis 2 | Average (ppbw) | ppmw |
|---|---|---|---|---|
| 1 | $2.15 \times 10^{16}$ | $2.10 \times 10^{16}$ | $2.13 \times 10^{16}$ | 0.41 |
| 2 | $1.22 \times 10^{16}$ | $1.25 \times 10^{16}$ | $1.24 \times 10^{16}$ | 0.24 |
| 3 | $1.93 \times 10^{16}$ | $1.99 \times 10^{16}$ | $1.96 \times 10^{16}$ | 0.38 |

The invention claimed is:

1. A method for purifying metallurgical grade (MG) silicon, comprising:
   (a) contacting a first silicon with a second mother liquor, to provide a first mixture;
   (b) melting the first mixture to a temperature above the liquidus, to provide a first molten mixture;
   (c) cooling the first molten mixture to a temperature below the solidus, to form first silicon crystals and a third mother liquor;
   (d) separating the first silicon crystals and the third mother liquor;
   (e) contacting the first silicon crystals and a first mother liquor, to provide a second mixture;
   (f) melting the second mixture to a temperature above the liquidus, to provide a second molten mixture;
   (g) cooling the second molten mixture to a temperature below the solidus, to form second silicon crystals and a second mother liquor;
   (h) separating the second silicon crystals and the second mother liquor;
   (i) contacting the second silicon crystals with a first solvent metal, to provide a third mixture;
   (j) melting the third mixture to a temperature above the liquidus, to provide a third molten mixture;
   (k) cooling the third molten mixture to a temperature below the solidus, to form third silicon crystals and a first mother liquor; and
   (l) separating the third silicon crystals and the first mother liquor;
   wherein the mother liquors and the first solvent metal comprise a solvent metal;
   wherein the method provides upgraded metallurgical-grade (UMG) silicon; and further comprising combining the first mother liquor with at least a portion of the second mother liquor prior to contacting the first mother liquor with the first silicon crystals.

2. The method of claim 1, wherein the method provides upgraded metallurgical-grade (UMG) silicon with boron levels less than 0.75 ppmw, aluminum levels less than 1.0 ppmw, phosphorous levels less than 0.8 ppmw and other metallic element levels totaling less than 1 ppmw, wherein the other metallic elements comprise one or more of magnesium, titanium, manganese, iron, cobalt, nickel, copper, zinc, molybdenum, cadmium, tin, tungsten, lead and uranium.

3. The method of claim 1, further comprising combining the second mother liquor with at least a portion of the third mother liquor prior to contacting the second mother liquor with the first silicon.

4. The method of claim 3, wherein the first mother liquor contains more of the solvent metal, compared to the second mother liquor.

5. The method of claim 1, further comprising removing at least a portion of the solvent metal from the third silicon crystals.

6. The method of claim 1, further comprising mechanically removing a powder, the solvent metal, a contaminate, or some combination thereof from the third silicon crystals.

7. The method of claim 1, further comprising melting the third silicon crystals to a temperature above the liquidus.

8. The method of claim 7, further comprising contacting a gas, slag molten silicon or some combination thereof to the molten third silicon crystals.

9. The method of claim 8, further comprising directionally solidifying silicon from the molten third silicon crystals, to form an ingot.

10. The method of claim 9, further comprising removing a portion of the ingot.

11. The method of claim 10, wherein the steps of directionally solidifying and removing at least a portion of the ingot are repeated one or more times.

12. The method of claim 1, wherein steps (a)-(d) are repeated one or more times.

13. The method of claim 1, wherein steps (e)-(h) are repeated one or more times.

14. The method of claim 1, wherein one or more of the mother liquors or the molten mixtures or a combination thereof are cleaned using a ceramic foam filter or gas injection containing chlorine.

15. The method of claim 8, further comprising cleaning the molten silicon with a ceramic foam filter or gas injection containing chlorine.

16. The method of claim 1, wherein the solvent metal comprises aluminum.

17. The method of claim 5, wherein removing comprises dissolving or reacting or a combination thereof with acid, base or other chemical.

18. The method of claim 8, wherein the gas comprises oxygen.

19. A method for purifying metallurgical grade (MG) silicon, comprising:
   (a) contacting a first silicon with a second mother liquor, to provide a first mixture;
   (b) melting the first mixture to a temperature above the liquidus, to provide a first molten mixture;
   (c) cooling the first molten liquid to a temperature below the solidus, to form first silicon crystals and a third mother liquor;
   (d) separating the first silicon crystals and the third mother liquor;
   (e) contacting the first silicon crystals and a first mother liquor, to provide a second mixture;
   (f) melting the second mixture to a temperature above the liquidus, to provide a second molten mixture;
   (g) cooling the second molten liquid to a temperature below the solidus, to form second silicon crystals and a second mother liquor;
   (h) separating the second silicon crystals and the second mother liquor;
   (i) contacting the second silicon crystals with a first solvent metal, to provide a third mixture;
   (j) melting the third mixture to a temperature above the liquidus, to provide a third molten mixture;
   (k) cooling the third molten liquid to a temperature below the solidus, to form third silicon crystals and a first mother liquor;
   (l) separating the third silicon crystals and the first mother liquor;
   (m) melting the third silicon crystals, to provide melted third crystals to a temperature above the liquidus;
   (n) directionally solidifying the melted third crystals, to provide a solidified silicon; and
   (o) removing at least a portion of the solidified silicon;
   wherein the mother liquors and the first solvent metal comprise a solvent metal,
   wherein the solvent metal comprises aluminum, and
   wherein the method provides upgraded metallurgical-grade (UMG) silicon; and further comprising combining the first mother liquor with at least a portion of the second mother liquor prior to contacting the first mother liquor with the first silicon crystals.

20. The method of claim 19, wherein the method provides upgraded metallurgical-grade (UMG) silicon with boron levels less than 0.75 ppmw, aluminum levels less than 1.0 ppmw, phosphorous levels less than 0.8 ppmw and other metallic element levels totaling less than 1 ppmw, wherein the other metallic elements comprise one or more of magnesium, titanium, manganese, iron, cobalt, nickel, copper, zinc, molybdenum, cadmium, tin, tungsten, lead and uranium.

21. The method of claim 19, further comprising, prior to step (n), contacting the melted third crystals with at least one of a gas or slag molten silicon.

22. The method of claim 19, further comprising repeating step (m) through (o) one or more times.

23. A method for purifying metallurgical grade (MG) silicon, comprising:
   (a) contacting a silicon A with a third mother liquor, to provide a mixture A;
   (b) melting the mixture A to a temperature above the liquidus, to provide a molten mixture A;
   (c) cooling the molten liquid A to a temperature below the solidus, to form a first silicon and a fourth mother liquor;
   (d) separating the first silicon and the fourth mother liquor;
   (e) contacting the first silicon with a second mother liquor, to provide a first mixture;
   (f) melting the first mixture to a temperature above the liquidus, to provide a first molten mixture;
   (g) cooling the first molten liquid to a temperature below the solidus, to form first silicon crystals and a third mother liquor;
   (h) separating the first silicon crystals and the third mother liquor;
   (i) contacting the first silicon crystals and a first mother liquor, to provide a second mixture;
   (j) melting the second mixture to a temperature above the liquidus, to provide a second molten mixture;
   (k) cooling the second molten liquid to a temperature below the solidus, to form second silicon crystals and a second mother liquor;
   (l) separating the second silicon crystals and the second mother liquor;
   (m) contacting the second silicon crystals with a first solvent metal, to provide a third mixture;
   (n) melting the third mixture to a temperature above the liquidus, to provide a third molten mixture;
   (o) cooling the third molten liquid to a temperature below the solidus, to form third silicon crystals and a first mother liquor;
   (p) separating the third silicon crystals and the first mother liquor;
   (q) melting the third silicon crystals to a temperature above the liquidus, to provide melted third crystals;
   (r) directionally solidifying the melted third crystals, to provide a solidified silicon; and
   (s) removing at least a portion of the solidified silicon
   wherein the mother liquors and the first solvent metal comprise a solvent metal,
   wherein the solvent metal comprises aluminum,
   wherein steps (a)-(d) are repeated zero times, once, or twice,
   herein steps (e)-(h) are repeated zero times, once, or twice,
   herein steps (i)-(l) are repeated zero times, once, or twice,
   wherein steps (m)-(p) are repeated zero times, once, or twice,
   wherein steps (q)-(s) are repeated zero times, once, or twice,
   wherein the method provides upgraded metallurgical-grade (UMG) silicon, and
   wherein other metallic elements comprise one or more of magnesium, titanium, manganese, iron, cobalt, nickel, copper, zinc, molybdenum, cadmium, tin, tungsten, lead and uranium; and further comprising combining the second mother liquor with at least a portion of the third mother liquor prior to contacting the second mother liquor with the first silicon.

24. The method of claim 23, wherein the method provides upgraded metallurgical-grade (UMG) silicon with boron levels less than 0.75 ppmw, aluminum levels less than 1.0 ppmw, phosphorous levels less than 0.8 ppmw and other metallic element levels totaling less than 1 ppmw.

* * * * *

UNITED STATES PATENT AND TRADEMARK OFFICE
CERTIFICATE OF CORRECTION

| | |
|---|---|
| PATENT NO. | : 8,580,218 B2 |
| APPLICATION NO. | : 13/494710 |
| DATED | : November 12, 2013 |
| INVENTOR(S) | : Turenne et al. |

It is certified that error appears in the above-identified patent and that said Letters Patent is hereby corrected as shown below:

On the Title Page

On page 2, in column 2, Item (56) under "Other Publications", line 17, after "Response", insert --filed--, therefor On page 2, in column 2, Item (56) under "Other Publications", line 23, delete "2007234343." and insert --2007234343,--, therefor On page 2, in column 2, Item (56) under "Other Publications", line 25, delete "2007234343." and insert --2007234343,--, therefor On page 2, in column 2, Item (56) under "Other Publications", line 30, delete "Pgs" and insert --pgs--, therefor In the Drawings On sheet 3 of 7, Fig. 3, reference numeral 112, delete "112" and insert --312--, therefor On sheet 3 of 7, Fig. 3, reference numeral 104, delete "104" and insert --304--, therefor In the Specification In column 1, line 12, delete "hereby;" and insert --hereby,--, therefor In column 1, line 36, after "metallurgical", insert --grade--, therefor In column 1, line 54, delete "tower" and insert --lower--, therefor In column 2, line 50, after "silicon", insert --crystals--, therefor In column 5, line 21, delete "puffed" and insert --purified--, therefor Signed and Sealed this
Twelfth Day of August, 2014

Michelle K. Lee
*Deputy Director of the United States Patent and Trademark Office*

CERTIFICATE OF CORRECTION (continued)
U.S. Pat. No. 8,580,218 B2

In column 5, line 38, delete "bottle," and insert --boule,--, therefor

In column 5, line 43, delete "recycled, silicon" and insert --recycled. UMG silicon--, therefor In column 7, line 27, after "metal", insert --.--, therefor In column 7, line 51, delete "Czochraiski" and insert --Czochralski--, therefor In column 7, line 56, delete "bottle," and insert --boule,--, therefor In column 9, line 15, delete "anon-furnace" and insert --a non-furnace--, therefor In column 9, line 51, before "crystals", insert --silicon--, therefor In column 9, line 61, delete "tower" and insert --lower--, therefor In column 11, line 25, before "mother", insert --first--, therefor In column 11, line 26, delete "hack" and insert --back--, therefor In column 11, line 29, delete "die" and insert --the--, therefor In column 11, line 45, delete "mother liquor." and insert --solvent metal.--, therefor In column 12, line 25, delete "entirety" and insert --entirely--, therefor In column 12, line 56, after "mother", insert --liquor--, therefor In column 12, line 60, after "intolerable", insert --levels,--, therefor In column 13, line 14, delete "alt" and insert --all--, therefor In column 13, line 29, after "Any", insert --powder,--, therefor In column 13, line 43, delete "stag" and insert --slag--, therefor In column 13, line 44, delete "wt" and insert --wt.--, therefor In column 14, line 30, delete "Materials" and insert --materials--, therefor In column 14, line 36, delete "silicon, 100%" and insert --silicon. 100%--, therefor In column 14, line 36, delete "Oxygen" and insert --oxygen--, therefor In column 14, line 37, delete "silicon, 1 Gas" and insert --silicon. 1Gas--, therefor In column 14, line 65, delete "difference" and insert --different--, therefor In column 15, line 25, after "UMG", insert --silicon--, therefor In column 15, line 31, delete "all, UMG" and insert --all. UMG--, therefor In column 15, line 36, delete "tower" and insert --lower--, therefor In column 16, line 33, delete "wilt" and insert --will--, therefor In column 16, line 43, after "known", insert --to those of skill--, therefor In column 16, line 45, after "known", insert --to those of skill--, therefor In column 16, line 47, delete "by" and insert --to--, therefor In column 17, line 15, delete "140" and insert --340--, therefor In column 18, line 9-10, delete "first mother liquor" and insert --second material--, therefor In column 18, line 62, after "Any", insert --powder,--, therefor In column 18, line 64, delete "Bi-product" and insert --By-product--, therefor In column 19, line 30, delete "difference" and insert --different--, therefor In column 20, line 2, delete "B, SP mother" and insert --B. SP mother--, therefor In column 20, line 29, delete "HO" and insert --HCl--, therefor In column 21, line 12, delete "A1 <0.01," and insert --A1<0.01,--, therefor In column 21, line 13, delete "pppmw." and insert --ppmw.--, therefor In column 23, line 61, delete "(ppbw)" and insert --(at/cm3)--, therefor In column 23, line 61, delete "(ppbw)" and insert --(at/cm3)--, therefor In column 23, line 62, delete "(ppbw)" and insert --(at/cm3)--, therefor In the Claims In column 24, line 33, in Claim 1, delete "metal;" and insert --metal,--, therefor In column 24, line 35, in Claim 1, delete "silicon;" and insert --silicon,--, therefor In column 25, line 62, in Claim 19, delete "silicon;" and insert --silicon,--, therefor In column 26, line 52, in Claim 23, after "silicon", insert --;--, therefor In column 26, line 58, in Claim 23, delete "herein" and insert --wherein--, therefor In column 26, line 59, in Claim 23, delete "herein" and insert --wherein--, therefor In column 27, line 2, in Claim 23, delete "uranium;" and insert --uranium,--, therefor